(12) United States Patent  (10) Patent No.: US 8,594,304 B2
Werth et al.  (45) Date of Patent: Nov. 26, 2013

(54) SYSTEMS AND METHODS FOR HYBRID DELIVERY OF REMOTE AND LOCAL TECHNICAL SUPPORT VIA A CENTRALIZED SERVICE

(75) Inventors: Theodore Werth, Bedford, MA (US); Richard T. Surace, II, New Ipswich, NH (US)

(73) Assignee: Plumchoice, Inc., Billerica, MA (US)

( * ) Notice: Subject to any disclaimer, the term of this patent is extended or adjusted under 35 U.S.C. 154(b) by 0 days.

(21) Appl. No.: 12/910,507

(22) Filed: Oct. 22, 2010

(65) Prior Publication Data

US 2011/0087511 A1  Apr. 14, 2011

Related U.S. Application Data

(63) Continuation of application No. 12/198,713, filed on Aug. 26, 2008, which is a continuation-in-part of application No. 12/169,706, filed on Jul. 9, 2008, now Pat. No. 7,676,035.

(60) Provisional application No. 60/949,676, filed on Jul. 13, 2007.

(51) Int. Cl.
*H04M 3/00* (2006.01)
*H04M 5/00* (2006.01)
*G06Q 10/00* (2012.01)
*G06K 11/00* (2006.01)

(52) U.S. Cl.
USPC ............ 379/265.05; 379/265.01; 379/265.12; 705/7.14; 705/305; 714/25; 714/46

(58) Field of Classification Search
USPC ............ 379/265.02, 266.09, 265.01, 265.03, 379/265.04, 265.05, 265.06, 265.07, 379/265.08, 265.09, 265.1, 265.11, 265.12, 379/265.13, 265.14, 266.01, 266.02, 379/266.03, 266.04, 266.05, 266.06, 379/266.07, 266.08, 266.1; 705/9, 1, 302, 705/318; 714/27, 25, 46
See application file for complete search history.

(56) References Cited

U.S. PATENT DOCUMENTS 5,963,911 A * 10/1999 Walker et al. ................ 705/7.12
6,560,330 B2 5/2003 Gabriel (Continued)

FOREIGN PATENT DOCUMENTS

WO  WO-02/28070  6/2002

OTHER PUBLICATIONS

Advisory Action in U.S. Appl. No. 12/169,706 dated Aug. 21, 2009.

(Continued)

*Primary Examiner* — Khai N Nguyen
(74) *Attorney, Agent, or Firm* — Foley & Lardner LLP; Christopher J. McKenna

(57) ABSTRACT

The present solution is directed to a hybrid customer support model for providing remote online support service in conjunction with local onsite support service. A local technician provides on site support service for a device at a premise for a predetermined amount of time. The onsite support by the local technician may be limited to a subset of the tasks for resolving an issue with the device or otherwise be limited to applying a subset or scope of skills to resolving the issue. In one embodiment, the local technician has a first type of skill from a plurality of skills. The local technician identifies an issue with the device and sends the issue to a centralized service. The centralized service receives an identification of the issue—the resolution of which may include a plurality of tasks. In one embodiment, each of the plurality of tasks is performed by one or more remote technicians having a skill type corresponding to the task. A resource pool is managed via the centralized service to support information flow in the hybrid model. The centralized service tracks service information and results.

16 Claims, 7 Drawing Sheets

(56) References Cited

U.S. PATENT DOCUMENTS

| | | | |
|---|---|---|---|
| 6,707,905 B2 | 3/2004 | Lenard | |
| 6,754,707 B2 | 6/2004 | Richards et al. | |
| 6,832,203 B1 | 12/2004 | Villena et al. | |
| 6,918,055 B2 | 7/2005 | Williams | |
| 2001/0051890 A1 | 12/2001 | Burgess | |
| 2002/0194047 A1* | 12/2002 | Edinger et al. | 705/9 |
| 2003/0069797 A1* | 4/2003 | Harrison | 705/26 |
| 2003/0187985 A1 | 10/2003 | Rohling et al. | |
| 2004/0007821 A1 | 1/2004 | Ramsay | |
| 2004/0010569 A1* | 1/2004 | Thomas et al. | 709/220 |
| 2004/0078721 A1* | 4/2004 | Williams | 714/46 |
| 2004/0109555 A1* | 6/2004 | Williams | 379/265.02 |
| 2004/0236820 A1 | 11/2004 | Flocken | |
| 2005/0071844 A1 | 3/2005 | Flockhart et al. | |
| 2006/0277096 A1 | 12/2006 | Levitus | |
| 2007/0021966 A1* | 1/2007 | Ellefson et al. | 705/1 |
| 2007/0055660 A1 | 3/2007 | Anderson | |
| 2007/0121896 A1 | 5/2007 | Patakula et al. | |

OTHER PUBLICATIONS

Agent Johnny Utah F.A.Q and Standard Operating Procedures ("AJU"). See http://cache.consumerist.com/assets/resources/2007/07/Agent%2520Johny%2520Utah%2520FAQ%2520-%2520Update%2520Ver2_268814.pdf, and http:scribd.com/doc/21866/Agent-Jonny-Utah-Overview.

Final Office Action in U.S. Appl. No. 12/169,706 dated May 28, 2009.

LogMeIn Press Release and user guide related to LogMeIn Rescue. Nov. 8, 2005.

Notice of Allowance in U.S. Appl. No. 12/169,706 dated Dec. 2, 2009.

Office Action on U.S. Appl. No. 12/198,713 dated Mar. 20, 2012.

Office Action on U.S. Appl. No. 12/198,713 dated Jun. 20, 2011.

Office Action on U.S. Appl. No. 12/910,507 dated Mar. 19, 2012.

Office Action Summary for Applications under Accelerated Examination regarding U.S. Appl. No. 12/169,706 dated Mar. 6, 2009.

Overview of SimpleHelp software. Published at: http://downloads.zdnet.com/download.aspx?docid=259212, Feb. 2008.

US Office Action DTD Dec. 22, 2010.

US Office Action DTD Mar. 27, 2012.

US Office Action DTD Jun. 24, 2011.

US Office Action on U.S. Appl. No. 12/699,999 dated Oct. 11, 2012.

* cited by examiner

SYSTEMS AND METHODS FOR HYBRID DELIVERY OF REMOTE AND LOCAL TECHNICAL SUPPORT VIA A CENTRALIZED SERVICE

RELATED APPLICATIONS

The present application is a Continuation of U.S. application Ser. No. 12/198,713, "Systems and Methods for Hybrid Delivery of Remote and Local Technical Support Via a Centralized Service," filed Aug. 26, 2008, which is a Continuation In Part of U.S. application Ser. No. 12/169,706, "Systems and Methods for Distributing Remote Technical Support via a Centralized Service," filed Jul. 9, 2008, which claims priority to U.S. Provisional Application No. 60/949,676, "Systems and Methods for Distributing Remote Technical Support Via a Centralized Service," filed Jul. 13, 2007.

FIELD OF THE INVENTION

The present application is generally directed to centralized technical support management services. In particular, the present application relates to providing onsite as well as remote technical support coordinated by a centralized service.

BACKGROUND

One way to provide support and repair of computers and electronics of consumers is through on-site services. On-site support services may be delivered via technical labor visiting the home to solve problems, provision of information to the home in the form of emails, online chat and phone, or remotely attaching to the devices and providing direct support. The delivery of labor to the home is immensely inefficient and expensive because of travel time and because the nature of the work is indeterminate. Resolving a problem in the home may require a short visit or a long visit, and may not be known until the technical labor is on-site. As a result, in home service providers typically schedule the availability of technicians with slack time to account for the indeterminate nature of the work as well as travel. The use of slack time to account for the nature of the work is wasteful and increases the amount of additional labor that may needed as demand increases. Not using slack time or using less slack time may decrease the availability of technicians to handle the next customer. This may result in abandoned customers, decreased response time and decrease customer satisfaction. The nature of the on-site work may be broad in technical scope as it may involve many different devices and software. This makes it very difficult if not nearly impossible for a service provider to find someone who is able to address the full spectrum of work on-site. Often times follow-up visits must be scheduled to complete work which could not be resolved by the dispatched technician. This results in longer delays in resolving the issue at home decreasing the customer's satisfaction with the support experience.

On the other hand, purely remote service cannot resolve problems when access to the computer or other devices is constrained due to malfunction, network issues or connections. Further there may be a hardware issue which requires a physical presence to repair or replace in order to fix. Therefore, it is challenging to provide an optimum customer service experience by using either onsite support or remote customer support.

SUMMARY OF THE INVENTION

The solution described herein provides an innovative use of remote services technology integrated with service personnel onsite at the point of service, such as a consumer repair outlet, to provide a pool of technical support resources to service a widely distributed resource need, such as support and repair resource needs of a chain of consumer outlets or an aggregated group of single proprietor consumer outlets. With this solution, qualified technical resources are provided from a central location to service a wide variety of environments. This is on-demand online remote support service is called or referred to as "support from a spigot." The distribution method enables the delivery of higher quality, more reliable and overall lower cost services. Instead of requiring dedicated technical resources at each location, lower skilled labor may be deployed at the location to enable the remote technical support services process.

The present solution breaks down a request for technical support into sub-domains of onsite and remote support which can be delivered by different skill types and methods. Amount of onsite labor time is optimized thereby allowing an efficient use of onsite labor. The skill set for onsite labor is more limited and hence amenable to more focused development. A resource pool is managed via a centralized service to support information flow in the hybrid labor model. The centralized service tracks service information and results.

The pool of remote technical resources is aggregated using centralized technology. Tools such as managed desktop sharing software with queuing software, phone automated call distribution systems (ACD) and enabling processes may used to aggregate the remote resources via a central point. Onsite personnel may enable the work via the centralized service. Once enabled, the pool of remote technical resources may deliver a broad range of services in the consumer outlet including installation of software, repair of software based problems, and general diagnostics. Because of the unique distribution model, the technical resources may work from any geographical location.

The centralized resource pool may be staffed to meet time of day demands, peak seasonal demands and even short bursts of demand at a much higher efficiency level than the traditional model. Work loads are statistically easier to forecast and staff when it is pooled at a central location. The efficiency of the centralized workforce is significantly higher because work load analysis can better predict staffing requirements and the work force will benefit from a steady stream of work. The centralized management of the pool of resources also allows for a complete service support structure to be put in place to hire, train and manage the specialized and/or technical resources. With availability of different and highly skilled resources via a centralized service, tiered escalation resources may be brought to bear on a support or repair issue without the need for travel or delay. Because of the ability to route work to specific resources and between specialized resources based upon work type, the most (or more) appropriate and lowest (or lower) cost labor may applied to address problem by category or type.

The hybrid model is a unique technology enabled support service model with significant benefits over the current state of the art. The benefits include a more efficient labor model. Overall cost of support is reduced since a large part of support is provided by remote labor instead of higher cost onsite labor. Onsite labor time is minimized and efficiency of onsite labor is increased. A larger pool of better skilled and better managed resources may be used to service a wide variety of service environments. The centralized pool of resource may more easily meet temporary surges in demand for services. The right skilled remote or onsite resources may be timely assigned to a technical problem to assure lower cost and higher quality work for each problem. With this new technology enabled support service, consumer outlets may provide new services and guarantees to their customers.

In one aspect, the present solution is directed to a method for providing remote online support service in conjunction with local onsite support service. A local technician provides on site support service for a device at a premise for a predetermined amount of time. The onsite support by the local technician may have a limited scope of skills directed to a subset of the tasks for resolving an issue with the device. In one embodiment, the local technician has a first type of skill from a plurality of skills. The local technician identifies an issue with the device and sends the issue to a centralized service. The centralized service receives an identification of the issue—the resolution of which may include a plurality of tasks. In one embodiment, each of the plurality of tasks is performed by one or more remote technicians having a skill type corresponding to the task. The centralized service assigns a first task of the plurality of tasks to a first remote technician having a second type of skill from the plurality of skills. The first remote technician performs the first task on the device via a first network connection to the device.

In one embodiment, the local technician may perform one or more tasks at the premises within the predetermined amount of time, leading to a resolution of the issue. In another embodiment, the local technician establishes remote connectivity between the device at the premise and the centralized service. In still another embodiment, the local technician identifies one or more tasks for resolution of the issue. In yet another embodiment, the centralized service identifies one or more tasks for resolution of the issue.

In one embodiment, the centralized service automatically assigns a first task to the first remote technician. In another embodiment, the centralized service assigns the first task based on one or more attributes of the first task corresponding to one or more skill types of the first remote technician. In still another embodiment, the centralized service automatically assigns a second task to a second remote technician having a third type of skill. The second remote technician performs the second task on the device via the first network connection or a second network connection to the device. In yet another embodiment, the centralized service assigns the second task to a third remote technician. In a further embodiment, each of the tasks for the resolution of the issue requires a different skill type.

In another aspect, the present solution is directed to a method for managing delivery of remote online support services and local onsite support services to a device at a premise, which may include a local technician performing a first task during the onsite support service for the device. The local technician has a corresponding skill type to perform the first task. A centralized service receives identification of an issue with the device and a status of the first task which is provided by the local technician. The resolution of the issue includes a plurality of tasks each of which is performed by one or more technicians having a corresponding skill type. The centralized service assigns a second task of the plurality of tasks to a second remote technician of a plurality of remote technicians. In a further embodiment, the centralized service determines a status of resolution of the issue via the status of the first task and a status of the second task performed by the second remote technician.

In one embodiment, the first local technician completes the first task during the onsite support service at the premise. In another embodiment, the first local technician is scheduled to perform the onsite support service for a predetermined amount of time. In still another embodiment, the first local technician or the centralized service identifies one or more tasks of the plurality of tasks required for the resolution of the issue. In yet another embodiment, the centralized service assigns the second task to the second remote technician based on one or more attributes of the second task corresponding to one or more skill types of the second remote technician. In one embodiment, the centralized service determines that the resolution of the issue is completed via completion of the first task at the premise and completion of the second task remotely by the remote technician. In another embodiment, the centralized service determines that the resolution of the issue is not completed and assigns the second task or a third task to a third remote technician. In still another embodiment, assignment of the second task to the third remote technician is done responsive to the determination that resolution of the issue is not completed.

In still another aspect, the present solution is directed to a system for supporting delivery of remote online support services and local onsite support services to one or more devices. The one or more devices may be located at one or more premises. The system includes an interface of a centralized service for receiving identification of a plurality of issues. Each of the plurality of issues is identified by local technicians for devices at a plurality of premises. Each of the local technicians provides onsite support service at a premise for a predetermined amount of time.

In another embodiment, the system includes an engine of the centralized service. The engine determines a plurality of tasks for a resolution of each of the plurality of issues. Each of the plurality of tasks is performed by one or more technicians having a corresponding skill type. In another embodiment, the system includes one or more work queues for assigning each of the tasks for each of the issues to a remote technician. In yet another embodiment, the remote technician is chosen from one or more remote technicians based on the remote technician having a corresponding skill to perform the task. In one embodiment, the centralized service determines the status of each issue based on the status of each task for resolving the issue.

In some embodiments, each of the devices at the plurality of premises is connected to the centralized service by a local technician. In another embodiment, one or more remote technicians connect via one or more networks to the device. In still another embodiment, the one or more remote technicians perform each of the plurality of tasks for resolution of the issue. In yet another embodiment, the centralized service monitors the status of each task for each issue and in response to the monitoring, assigns one or more tasks to remote technicians. In a further embodiment, the centralized service automatically assigns tasks to remote technicians based on attributes of the tasks corresponding to one or more skill types of the remote technicians.

BRIEF DESCRIPTION OF THE FIGURES

The foregoing and other objects, aspects, features, and advantages of the invention will become more apparent and better understood by referring to the following description taken in conjunction with the accompanying drawings, in which.

DETAILED DESCRIPTION

For purposes of reading the description of the various embodiments of the present invention below, the following descriptions of the sections of the specification and their respective contents may be helpful:

Section A describes a platform and centralized service for providing on demand and online remote technical support services; and Section B describes systems and methods for delivering technical support services using a hybrid model of local onsite support with remote online support services.

A. Centralized Service for Providing on Demand and Online Technical Support

Figure 1:
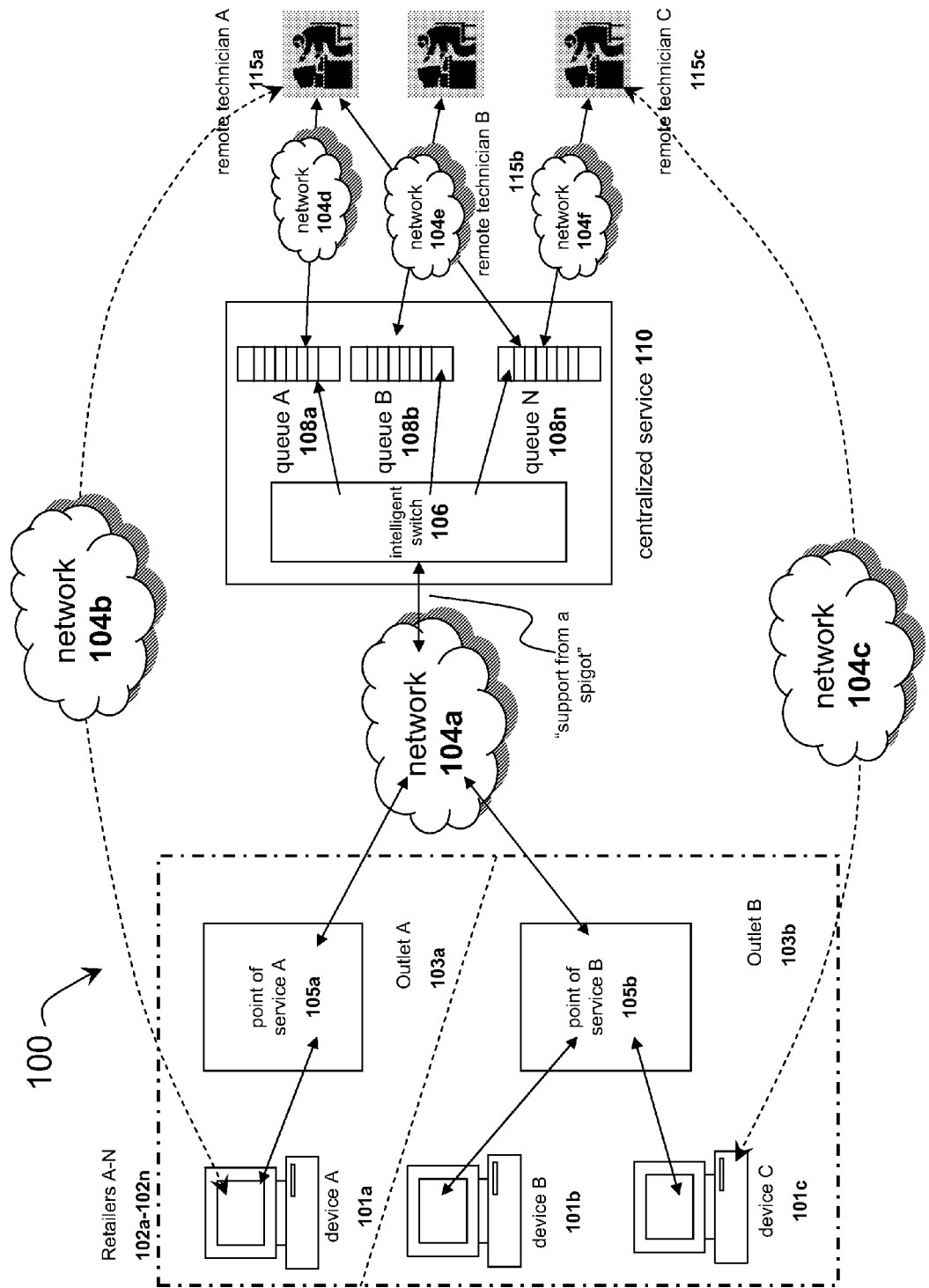
FIG. 1 is a block diagram of an embodiment of an environment to provide remote technical support to a device via a centralized service.

Referring to FIG. 1, a block diagram of an environment 100 to provide remote technical support to a device via a centralized service is shown and described. In brief overview, the system includes one or more consumer outlets 103a, 103b (103 in general) of a retailer 102 connected via a network 104 to a centralized service 110. In one embodiment, the centralized service 110 provides an interface to the consumer outlet 103 via an intelligent switch 106 that provides connectivity, work flow and queue management, and service process management for a remote technician from a pool of remote technicians 115a-115c (115 in general) to perform work on a device 101 at the consumer outlet 103. In another embodiment, an outlet 103 includes a point of service 105 to which a device 101 requiring service is connected. In still another embodiment, a request for service from the device 101 is transmitted to the centralized service 110 via the point of service 105 and a network 104a. In yet another embodiment, the centralized service 110 includes one or more queues 108a-108n (108 in general) where the request from the device 101 is stored. In a further embodiment, a remote technician 115a picks up a request from a queue 108a by connecting to the centralized service 110 over a network 104d. In one embodiment, the remote technician 115a connects to the device 101a over a network 104b to provide remote technical service to the device 101a.

The above-depicted system is an example embodiment of an environment for deploying the on-demand service referred to as "support from spigot." The centralized service 110 include remote technical support services to allow one or more remote technicians 115a-115c to perform any type and form of support, service and repair on a device 101 connected via a network 104a, such as the Internet at the consumer outlet 103. The consumer outlet 103 may have a workbench providing connectivity and access to the Internet Switch and the centralized service 110 via an Internet Interface.

The device 101 may comprise any type and form of electronic device. In one embodiment, a device 101 is any type of computing device such as a desktop computer or a laptop computer. In another embodiment, the device 101 is an electronic equipment capable of connecting to a network. In still another embodiment, the device 101 is any type and form of communications device. In yet another embodiment, the device 101 is a cellular phone. In one embodiment, the 101 is a BLACKBERRY device manufactured by Research in Motion (RIM) of Waterloo, Ontario, Canada. In another embodiment, the device 101 is a personal digital assistant (PDA) phone or smartphone such as one manufactured by Palm Inc. of Sunnyvale, Calif. In still another embodiment, the device 101 is an IPHONE manufactured by Apple Inc. of Cupertino, Calif. In further embodiments, the device 101 can be a digital camera, a video cassette recorder (VCR), a digital video recorder (DVR) such as one manufactured by TiVo Inc. of Alviso, Calif., a printer, a telephone, a digital music player or any other electronic gadget and equipment as apparent to one skilled in the art.

Furthermore, the device 101 may include a network interface to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface may comprise a built-in network adapter, network interface card, PCMCIA network card, card bus network adapter, wireless network adapter, USB network adapter, modem or any other device suitable for interfacing the device 101 to any type of network capable of communication and performing the operations described herein.

The device 101 may include any type and form of operating system, which control scheduling of tasks and access to system resources. In some embodiments, the device 101 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP and WINDOWS VISTA, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In one embodiment, the centralized service 110 is executed from a server or any other computing device. The server may be referred to as a file server, application server, web server, proxy server, or gateway server. In some embodiments, the server may have the capacity to function as either an application server or as a master application server. In one embodiment, the system 100 may include multiple, logically-grouped servers. In these embodiments, the logical group of servers may be referred to as a server farm. In some of these embodiments, the servers of the farm may be geographically dispersed. In some cases, a farm may be administered as a single entity. In other embodiments, the server farm comprises a plurality of server farms. In one embodiment, the server and/or server farm executes one or more applications on behalf of the centralized service 110. The servers within each farm can be heterogeneous. One or more of the servers can operate according to one type of operating system platform (e.g., WINDOWS NT, manufactured by Microsoft Corp. of Redmond, Wash.), while one or more of the other servers can operate on according to another type of operating system platform (e.g., UNIX or Linux). The group of servers logically grouped as a farm may be interconnected using a wide-area network (WAN) connection or metropolitan area network (MAN) connection. Data transmission speeds between servers in the farm 38 can be increased if the servers are connected using a local-area network (LAN) connection or some form of direct connection.

In further overview of FIG. 1, the consumer outlet 103 may receive a device 101 from a customer at a point of service 105, such as at a support desk or area at a retailer. For example, a store associate may receive a computer device from a customer requesting support, service or repair on the computer. The store associate may connect the computer at a point of service 105 to access the centralized service 110. In one embodiment, the point of service 105 includes an Internet Interface 116 (not shown). In another embodiment, the store associate may, via the Internet Interface 116, set up and configure the type of problem to be solved or the type of service to be performed via the centralized service 110. For example, the store associate may enter information on a work order form, such as via one or more web pages, and submit the form to the Internet Switch via the Internet Interface 116. In one embodiment, the information may identify the computer attached at the workbench. In another embodiment, the Internet Switch 106 receives the form and information and places the device 101 and/or work to be performed on the device 101 in a queue 108. In still another embodiment, the queue 108 may be organized and arranged in any manner including by type or category of device, type or category of service, nature of the problem, and/or location or name of consumer outlet 103. In yet another embodiment, the Internet Switch 106 includes scheduling and dispatching logic/software to dispatch the work order to the next available remote technician 115.

In one embodiment, the Internet Switch 106 may select the next remote technician using any type and form of decision criteria and/or load balancing scheme. In some embodiments, the Internet Switch 106 selects the next remote technician who is suited to perform the type of service, support or repair requested on the device 101. In one embodiment, the switch 106 determines from the request from the device 101, a type of work and one or more service level attributes required to perform the type of work at a predetermined service threshold. The service level attributes and the predetermined service threshold are discussed in further details with reference to FIG. 2.

In one embodiment, the selected remote technician 115a receives a prompt, a communication or any type and form of notice to perform work on the device 101 attached at the consumer outlet. The information from the submitted form and in the queue of the Internet Switch may identify the device 101, such as by Internet Protocol, Machine Access Control (MAC) address or by any other identifiers uniquely identifying the device 101. In another embodiment, the remote technician 115a connects to the identified device 101a attached at the workbench using any desktop sharing and remote connectivity and support technology, such as via the GoToAssist technology manufactured by Citrix Online, LLC of Santa Barbara, Calif., part of Citrix Systems, Inc. of Ft. Lauderdale, Fla. or BOMGAR remote access software developed by BOMGAR of Ridgeland, Miss. In still another embodiment, the remote technician 115a performs any type of hardware and software diagnostic, installation, repair, and/or configuration. In yet another embodiment, when the service is completed, the remote technician 115a may provide an electronic report on the device 101a indicating that service has been completed, any diagnostic information and the type of services performed and any results thereof.

Although FIG. 1 shows a plurality of networks including network 104a between the consumer outlet 103 and the centralized service 110 and networks 104d-104f between the centralized service 110 and the remote technicians 115, any or all of the outlets 103, the centralized service 110 and remote technicians 115 may be on the same network 104. In one embodiment, any of the networks 104 may be the same type of network or different types of networks. The network 104 can be a local-area network (LAN), such as a company Intranet, a metropolitan area network (MAN), or a wide area network (WAN), such as the Internet or the World Wide Web. The network(s) 104 may be a private or public network. In one embodiment, the network of the consumer outlet may be a private network and network of the Internet Switch or centralized services may be a public network, or vice versa. In another embodiment, the network of the centralized services and the network of the consumer outlet may be private networks. In still another embodiment any network 104 may include one or more networks of different kinds as apparent to one of ordinary skill in the art.

In one embodiment, the network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may comprise a wireless link, such as an infrared channel or satellite band. In another embodiment, the topology of the network may be a bus, star, or ring network topology. In other embodiments, the network and network topology may be of any such network or network topology as known to those ordinarily skilled in the art capable of supporting the operations described herein.

In some embodiments, the centralized service 110 may connect to the consumer outlet 105 or a device at the point of service 105 using any type and form of protocol, such as any internet protocols for communications. Examples of such protocols include but are not limited to application layer protocols such as HyperText Transfer Protocol (HTTP) and Dynamic Host Configuration Protocol (DHCP), transport layer protocols such as Transmission Control Protocol (TCP) and User Datagram Protocol (UDP), network layer protocols such as Internet Protocol (IP), datalink layer protocols such as IEEE 802.11, Token Ring and Ethernet and physical layer protocols such as RS-232 and Synchronous Optical Networking (SONET). In some embodiments, secure communications between the remote technician 115 and the centralized service 110 are established via encryption, for example via a secure socket layer (SSL) or a virtual private network (VPN). In other embodiments, secure communications between the remote technician 115 and the device 101 at the consumer outlet 103 are established via encryption, for example via a secure socket layer (SSL) or a virtual private network (VPN). In yet another embodiment, end to end security is established via the remote technician 115 and the device 101 at the consumer outlet 103. With secured communications, the privacy of the data on a device 101 may be protected and/or maintained. Because of the ubiquity of networks, network connectivity and the internet the systems and methods of the system described herein is available in just about any possible customer scenario as apparent to one ordinarily skilled in the art.

Figure 2:
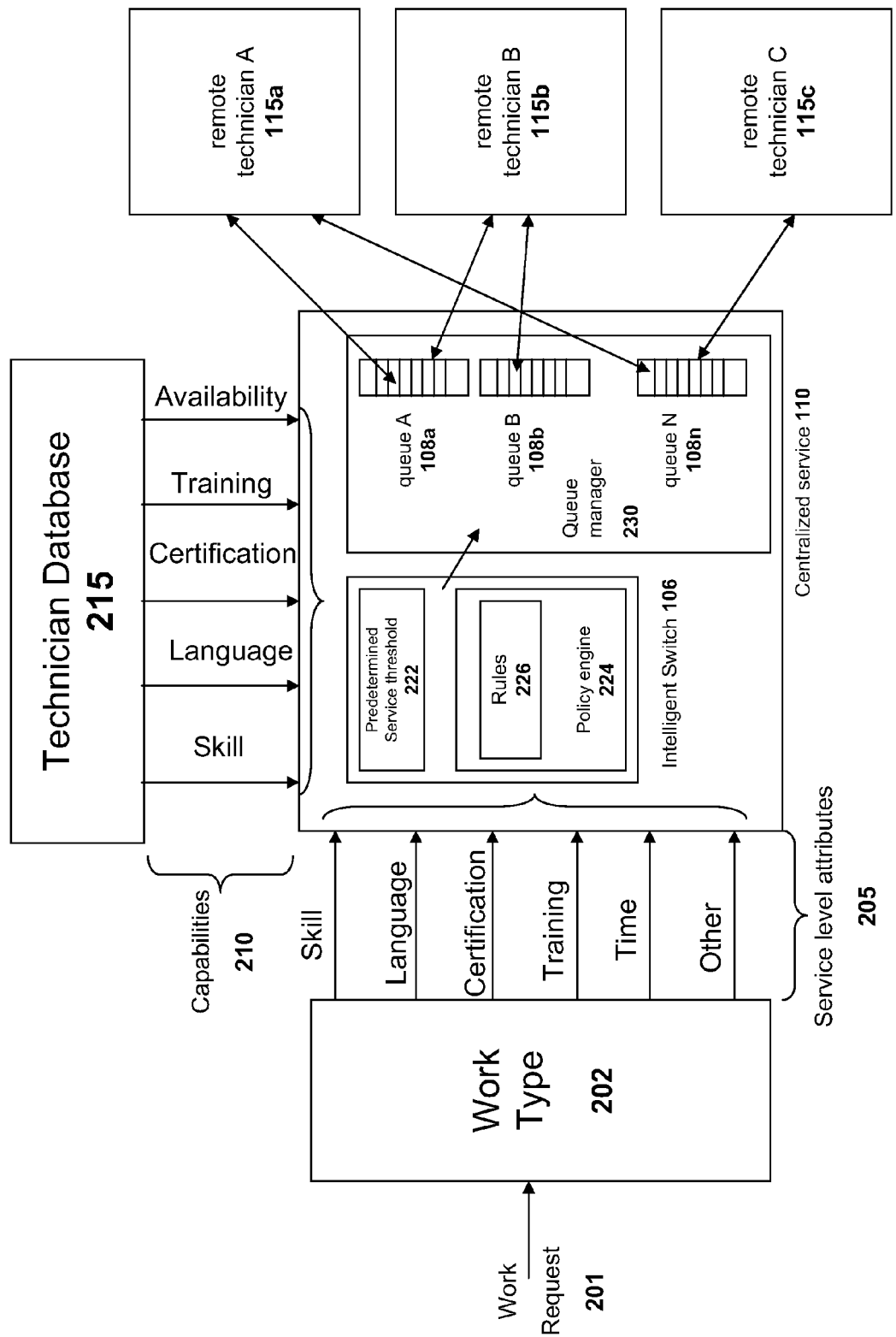
FIG. 2 is a block diagram depicting an embodiment of allocating a service request to a remote technician by a centralized service.

Referring now to FIG. 2, a block diagram depicting an embodiment of a centralized service for allocating a service request to a remote technician is shown and depicted. In one embodiment, the centralized service receives a request for work 201. A work type 202 is determined from the work request 201 to identify one or more service level attributes 205 required to service the work request 201. In another embodiment, the centralized service communicates with a technician database 215 to determine capabilities 210 of technicians available to service the work request. In still another embodiment, an intelligent switch 106 routes the incoming work request 201 to a queue 108a of a plurality of queues 108a-108n (108 in general). In yet another embodiment, the intelligent switch 106 matches the service level attributes 205 of the work request 201 with the capabilities 210 of the remote technicians 115 to determine a remote technician 115a suited to service the work request 201 at a predetermined service level 222. In one embodiment, the intelligent switch 106 includes a policy engine 224 that communicates with a set of rules 226 to perform the matching. In a further embodiment a queue manager 230 manages allocation and moving of requests between the plurality of queues 108.

In one embodiment, the Intelligent Switch 106 comprises any type and form of mechanism and interface for connecting, dispatching, identifying and managing the flow of work from a consumer outlet 103 to a remote technician 115. In another embodiment, the Intelligent Switch 106 may comprise software, hardware or any combination of software and hardware. In some embodiments, the Intelligent Switch 106 includes dispatching and/or scheduling logic, functions and operations to identify and select the most appropriate technician and then pass the connection to the computer so the service may be performed. In another embodiment, the Intelligent Switch 106 may have information on which technicians 115 are logged in and currently available and the skill sets, capabilities 210 and/or knowledge that they have and type of work or service they may perform. In some embodiments, the Intelligent Switch 106 tracks real-time which technicians are available and which technicians are currently performing a service, and for which consumer outlet 103 and/or device 101. In still another embodiment, the Intelligent Switch 106 has, obtains or maintains profiles for each of the remote technicians 115. A profile identifies the technician's technical capabilities, certifications, types of service or work authorized or assigned to perform, and/or performance information and statistics for past service work. In one embodiment, the technician profiles are stored in a technician database 215 in communication with the centralized service 110.

A work type 202 comprises any type and form of information, data or identification of the work to be performed in response to the work request 201. In one embodiment, a work type 202 is identified from the incoming work request 201. In another embodiment, the work type identification includes identifying one or more service level attributes 205 from the work request 201. In still another embodiment, the service level attributes 205 include but are not limited to one or more of the following: a level of skill, a certification or a level of training to perform the type of work on the device at the predetermined service threshold. In another embodiment, the service level attributes 205 include but are not limited to a language, location or time to perform the type of work on the device at the predetermined service threshold. In yet another embodiment, a service level attribute 205 may include one or more sub-attributes derived from one or more service level attributes 205. In a further embodiment, a service level attribute may be a function of one or more service level attributes 205. In one embodiment one or more service level attributes 205 of a work type 202 may be determined using any algorithm or qualitative and/or quantitative analysis on the work request 201. In another embodiment, the service level attributes are explicitly specified in the work request 201. In still another embodiment, the service level attributes 205 are encoded in the work request 201.

In one embodiment, the technician database 215 stores the profiles of one or more remote technician 115. The technician database 215, generally also referred to as data source, may comprise any type and form of data. In one embodiment, the technician database 215 comprises any type and form of relational database, non-relational database, object database, or object-oriented database. In some embodiments, the technician database 215 comprises any of the database products manufactured by Oracle of Redwood Shores, Calif. In another example, the technician database 215 comprises any of the versions of Microsoft SQL Server manufactured by Microsoft Corporation of Redmond, Wash. In one embodiment, the technician database 215 provides an Open Database Connectivity (ODBC) interface for accessing the database. In another embodiment, the technician database 215 comprises a server farm of databases. In some embodiments, the technician database 215 comprises a database cluster.

In other embodiments, the technician database 215 comprises a file, such as a CSV (command separated) formatted file. In another embodiment, the technician database 215 comprises a file having fields or values delimited in any manner by using fixed length field or any predetermined field or value delimiters. The file may have a structure, format, and/or content readable and understandable by the centralized service 110, or any portion thereof. In other embodiments, the technician database 215 includes an application, program, software, service, process or task providing access to data. The technician database 215 may provide any type and form of application programming interface (API), such as an XML, object, or web-service based interface for accessing or providing data.

A capability 210 of a remote technician 115 comprises any type and form of information, data and identification related to one or more of a background, skill level, knowledge, training, experience, certification and any other attribute of the technician 115. In one embodiment the technician profiles identify the capabilities 210 of each of the one or more remote technicians 115. In another embodiment, the capabilities 210 of a remote technician may include but are not limited to one or more of the following: skill set, language spoken, certifications, training received, availability and any other attribute as apparent to one ordinarily skilled in the art. In yet another embodiment, a capability 210 of a remote technician 115 may be a function of one or more capabilities 210. In one embodiment, the capabilities 210 of a remote technician 115 may include an attribute derived from a performance history of the technician 115. In another embodiment, the capabilities 210 of a remote technician 115 may be classified according to one or more different attributes such as work type, customer type, interaction with a specific customer and any other attribute. In still another embodiment, a remote technician 115 acquires a capability 210 by testing out at a certain level of certification. In one embodiment, the remote technician is certified for a skill or level of skill by passing any type and form of testing or certification. In yet another embodiment, if a technician 115 with valid certification is not available, a related or previous certification may be considered as a capability 210. For example, if a technician with currently valid certification is not available, a substantially recently expired certification may be considered as a capability 210. In some embodiments, a technician's certification may become obsolete, old or no longer valid. In one case, although the technician's certification is not current, the technician may be selected by the centralized service for that task based on previous certification.

In one embodiment, the Intelligent Switch 106 matches the service level attributes 205 with the capabilities 210 of the technicians 115. In another embodiment, the Intelligent Switch communicates with the technician database 215 to identify the capabilities 210 of one or more remote technicians 115. In still another embodiment the service level attributes 205 are matched to capabilities 210 by the Intelligent Switch 106 based on an algorithm. In yet another embodiment, each of the service level attributes 205 and/or the capabilities are assigned weights by the centralized service 110 in communication with the policy engine 224. In one embodiment, the Intelligent Switch 106 executes a learning algorithm to match the service level attributes 205 to the capabilities 210. In another embodiment, the Intelligent Switch 106 uses any algorithm, software, hardware or a combination thereof to match the service level attributes 205 to the capabilities 210. In still another embodiment, the service level attributes 205 and the capabilities 210 are matched to determine a technician 115 substantially suited to service a work request 201.

In some embodiments, the service level attribute of a level of skill may be matched to a skill level of a remote technician 115. In one of these embodiments, a skill may represent a general area of expertise such as hardware, software or networks. In another of these embodiments, a skill may represent more focused expertise in any hardware related area such as motherboards, graphics cards, monitors or network cards. In still another of these embodiments, a skill may represent a focused expertise in a software related area such as databases, anti-virus software, firewalls and operating systems.

In other embodiments, the service level attribute of language may be matched to a corresponding language capability of a remote technician 115. In one embodiment, a language may represent a spoken and/or written language such as English, Chinese, Spanish or Hindi. In another embodiment, a language may be a computer language such as C, C++, Java, HTML or Pascal. In still another embodiment, a language may be any form of communication between two individuals such as sign language.

In still other embodiments, service level attributes such as certification and/or level of training are matched to corresponding capabilities of the remote technicians 115. In one embodiment, a certification may be from an organization or a company such as Cisco Certified Network Associate (CCNA) certifications from Cisco Systems Inc. of San Jose, Calif. or Microsoft Certified Technology Specialist (MCTS), Microsoft Certified Professional Developer (MCPD), Microsoft Certified IT Professional (MCITP) and Microsoft Certified Architect (MCA) certifications from Microsoft Corporation of Redmond, Wash. In other embodiments, a certification may be one or more of an authorization, an endorsement, a promotion, a validation and an authentication from any company, organization, institution or individual as apparent to one skilled in the art. In one embodiment, a training may be a formal education received in an area of concentration. In another embodiment, a training may represent hands on experience in a related field. In still other embodiments, a training may represent means for developing a skill and/or expertise in one or more areas.

In yet other embodiments, a service level attribute of time is matched to a corresponding capability of a remote technician 115. In one embodiment, time may be a service level attribute such as the time the work request is received at the centralized service 110. In another embodiment, a time may represent a capability of a remote technician 115 such as a window of availability. In other embodiments, a time may represent one or more of service level attributes and/or capabilities such as maximum/minimum turn-around time, maximum/minimum waiting time and any other related time as apparent to one ordinarily skilled in the art. In still another embodiment, the time may represent a period by which a technician executes a task at a predetermined service threshold 222. For example, a technician may be selected based on average historical times to execute one or more support tasks or any statistical temporal measurement of task execution. In some embodiment, the centralized services selects and assigns work to technicians based on their speed of execution, such as indicated by average task times.

In one embodiment, the Intelligent Switch 106 determines the technician suitable to service a work request 201 to meet a predetermined service threshold 222. A predetermined service threshold is any type and form of a metric used to identify one or more qualitative and/or quantitative aspect related to performing a service, such as any measurable element of the service. In one embodiment, the pre determined service threshold is a quantitative metric such as turnaround time. In another embodiment, the service threshold is a qualitative metric such as customer satisfaction. In yet another embodiment, the service threshold 222 is considered as a service level attribute 205 in determining a technician to service a work request 201. In one embodiment, the service threshold 222 may be specified as a part of the work request 201. In another embodiment, a technician 115 is selected by the Intelligent Switch 106 to optimize the probability of meeting the service threshold 222. In other embodiments, the service threshold 222 may be one or more characteristics and/or capabilities of the remote technician 115 such as age, language spoken, accent, dialect, sex, ethnicity or any other characteristics for which a customer may indicate a preference. Via customer selection or profile, a technician may be selected based on any number of non-technical characteristics.

In some embodiments, the Intelligent Switch 106 includes a policy engine 224. In another embodiment, the policy engine 224 is driven by a set of rules 226. In one embodiment, the policy engine 224 may include, for example, an intelligent statistical engine or other programmable application(s). In another embodiment, the policy engine 224 provides a configuration mechanism to allow a user to identifying, specify, define or configure a matching policy. The policy engine 224, in some embodiments, also has access to memory to support data structures such as lookup tables or hash tables to enable user-selected matching policies. In other embodiments, the policy engine 224 may comprise a set of rules 226 including any logic, rules, functions or operations to determine and provide access, control and management of service level attributes 205 and capabilities 210 being matched by the intelligent switch 106.

In one embodiment, the Intelligent Switch 106 includes the Citrix Online GoToAssist support portal. In other embodiments, the Intelligent Switch may include any online support systems from WebEx Communications, LogMeIn or Microsoft. In some embodiments, the Intelligent Switch 106 includes software, functions or logic that call an application programming interface (API) to the support portal and software system to perform desired functionality and operations described herein. In one embodiment, the Intelligent Switch 106 is designed and constructed to forward work to specific agents or technical resources or pools of agents/technical resources based upon information received via the Internet Interface, such as answers to questions on a web form.

In one embodiment, the Intelligent Switch 106 may include any type and form of logic, functions or executable instructions to organize support and/or work request into queues 108 and to dispatch or schedule such request to technicians 115. In another embodiment, the Intelligent Switch 106 may identify, arrange or organize queues 108a-108n (108 in general) in any manner, scheme or into any type and form of categories. In some embodiments, the queues 108 may be organized by consumer outlet or locations thereof. In other embodiments, the queues 108 may be organized by groups of consumer outlets 103, such as for a retail chain. In another embodiment, the queues 108 may be organized by the type of service requested and/or the nature of the problem. For example, queues 108 may be organized for application installation services, checkup and virus scan services or software or operating system upgrades. In still other embodiments, the queues 108 may be organized by the type or category of software, application or operating system. In another embodiment, the queues 108 may be organized by type of device, such as computing, MP3, printer, etc. In further embodiments, the queues may be organized by the manufacturer or brand of the device. In one embodiment, the queues 108 may be organized or arranged by groups of one or more technicians 115. In another embodiment, the queues may be arranged by geographic locations of one or more technicians.

The scheduling and/or dispatching functionality of the Intelligent Switch 106 uses any type and form of logic, algorithm or scheme to match work from a queue to a suitable technician. In one embodiment, the Intelligent Switch determines the next available remote technician 115 to give the work from a queue 108a or any of the queues 108. In some embodiments, the Intelligent Switch 106 characterizes the work type 202 based on one or more service level attributes 205 that are required or desired to perform the work 201. In another embodiment, the Intelligent Switch 106 has knowledge of capabilities 210 of the remote technicians 115, such as from profiles stored in the technician database 215. In still another embodiment, the Intelligent Switch 106 determines and selects a technician 115a suited to service the work request by matching the service level attributes 205 to the capabilities 210 of the technicians. In one embodiment, the Intelligent Switch 106 selects a technician 115a best suited to service the work request. Upon this determination, in one embodiment, the Intelligent Switch 106 delivers or informs the matched or selected technician 115a of the item he or she should work on next. If work type 202 is not known then the Intelligent Switch 106 may assign the queued work to a technical resource that is capable of diagnosing problem for later redirect to the most appropriate technician. For example, after diagnosing the problem, the technical resource may resubmit the work to the Intelligent Switch 106 to be assigned to a technical resource. The diagnosing technical resource may assign the work to the appropriate queue 108 or provide information from the diagnostics for the Intelligent Switch 106 to assign the work to the appropriate queue 108 or technical resource.

The Intelligent Switch 106 uses any rules and/or algorithm to select a technician suited to service a work request. In one embodiment, the service level attributes 205 and/or the capabilities may be ordered based on a priority of requirement. In another embodiment, each attribute 205 and/or capability 210 is assigned a weight prior to the selection. In still another embodiment, one or more of the attributes 205 and/or the capabilities 210 may be marked as essential. In such an embodiment, if a suited technician satisfying the essential capability is not available, the work request 201 is put on hold till a suited technician becomes available. In one embodiment, if the Intelligent Switch 106 cannot select a suited technician 115, a communication is sent out to all available technicians 115 to query if any technician is capable of servicing the work request 201. In one embodiment, one service level attribute is matched to a corresponding capability to select a remote technician. In another attribute, a plurality of service level attributes is matched to a plurality of corresponding capabilities to select a remote technician. In some embodiments, a multi-level process is employed to select a remote technician. In one of these embodiments, in one level, one or more remote technicians are selected as a first group based on matching one or more high priority attributes to one or more corresponding capabilities. In another of these embodiments, in another level, one or more remote technicians are selected from the first group based on matching one or more lower priority attributes to one or more corresponding capabilities. In some embodiments, one or more technicians are selected based on weights assigned to one or more skills and capabilities. For example, a technician A may have skill 1, skill 2 and skill 3 at different levels. Technician 2 may have skill 4 and skills 1-3 at lower levels than that of technician 1. If for a certain task, skill 4 has a very high weight (e.g. it is mandatory and not optional) while skills 1-3 have relatively low weights, technician 2 may be selected over technician 1. As another example, if a task requires a high weight on one or more of skills 1-3 and a low weight on skill 4, technician 1 may be selected over technician 2.

In one embodiment, the remote technical support system technician resources are aggregated by the Intelligent Switch 106 into pools of labor which are used to resolve the issues aggregated from the customer outlets 103. Because the technical resources deliver their services remotely through networks, such as the Internet they can be located in call centers or in a distributed work environment such as a home. As long as the technical resource has access to the network or the Internet they can provide services for customers.

In one embodiment, the Intelligent Switch 106 may include any type and form of logic, function, operations or executable instructions to perform load balancing between one or more queues 108 and the remote technicians 115. For example, the Intelligent Switch 106 may load balance queues 108 based on the type of work and the capabilities 210 of available technicians. In some cases, technicians may have multiple skills sets that may be used to work on request in multiple queues. The Intelligent Switch 106 may load balance service requests or the queues to meet the predetermined service threshold 222 or metrics for a consumer outlet 103. The Intelligent Switch 106 may load balance the queues according to priority levels assigned at a consumer outlet 103. In other embodiments, the Intelligent Switch 106 may load balance queues 108 across a retailer's chain of consumer outlets 103. In yet another embodiment, the Intelligent Switch 106 may load balance queues based on geographic locations, such as for a region of consumer outlets 103. In a further embodiment, the Intelligent Switch 106 may use performance and timing metrics of work performed to load balance to remote technicians 115 based on average support resolution times based on queue type or historical time of the technician 115.

In some embodiments, the remote technical support services provided via the Intelligent Switch 106 may include any type and form of remote technical or online services, such as PlumChoice Online PC services of Billerica, Mass., FireDog services provided by CircuitCity Stores, Inc., online services provided by Support.com and tech24 at tech24.com.

Figure 3:
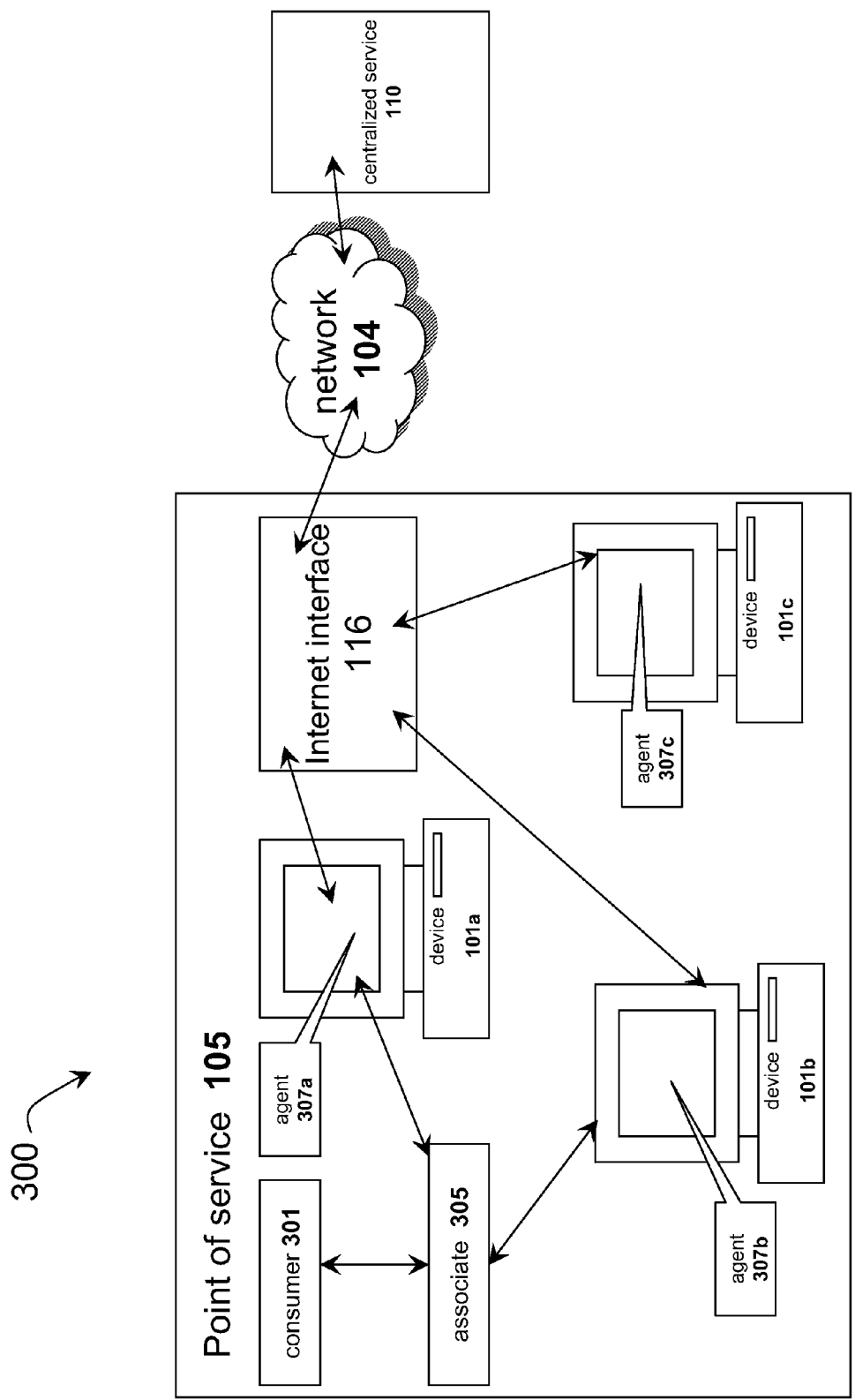
FIG. 3 is a block diagram of an example embodiment of a point of service.

Referring now to FIG. 3, a block diagram of an example of a point of service 105 is shown and described. In one embodiment, the point of service 105 includes the internet interface 116 to communicate with the centralized service 110 over one or more networks 104. In another embodiment, devices 101a-101c (101 in general) are connected to the Internet Interface 116 to access the centralized service 110. In still another embodiment, a consumer 301 brings a device 101 to be serviced to the point of service 105. In yet another embodiment, a store associate 305 communicates with the consumer 301 and connects the device 101 to the Internet Interface 116. In a further embodiment, a device 101 can be connected to the Internet Interface 116 by the consumer 301 directly without the intervention of a store associate 305.

In one embodiment, an agent 307 executes on the device 101 to communicate with the centralized service 110. The agent may be software, hardware or any combination of software and hardware. In another embodiment, the agent 307 transmits the service request to the centralized service via the Internet Interface 116. In still another embodiment, the agent 307 is installed in the device 101 at the point of service 105. In one embodiment, the agent 307 is downloaded automatically on the device 101 from the centralized service 110 when the device 101 is connected to the centralized service 110. In another embodiment, the agent 307 is manually downloaded and installed by the store associate 305. In yet another embodiment, the agent 307 runs a diagnostic test on the device 101 and transmits the results to the centralized service 110 via the Internet Interface 116. In a further embodiment, the agent 307 presents a form and/or a questionnaire to be filled by the consumer 301 and/or the associate 305. In one embodiment, the agent 307 establishes a secure connection with the centralized service 110.

In one embodiment, the on-demand remote technical services provided via the centralized service 110 and Internet Switch 106 is designed and constructed to allow a lower skilled, non-technical store associate 305 to provide access to remote skilled technicians 115 to diagnose and fix technical problems or perform routine system support functions such as software installation and computer configuration. In another embodiment, the Internet Switch 106 provides a simple easy to use interface that allows the associate to connect the computer to the Intelligent Switch 106 through a network 104a. In still another embodiment, the Intelligent Switch 106 directs the work to the next available technical resource which has the skill set or capability to address the work type required to be performed on the computer. In yet another embodiment, technicians provide support directly on the device 101 at the remote location using desktop sharing software combined with tools which allows typical interaction with the remote system.

The Internet Interface 116 comprises any type and form of interface to provide access to the device 101 via one or more networks 104. In one embodiment, the Internet Interface 116 may include software or hardware, or any combination of software and hardware. In some embodiments, the store associate configures the device 101 to connect to the point of service 105 of the consumer outlet 103. In other embodiments, the Internet Interface 116 is designed and constructed to allow the device 101 to be automatically connected to the point of service 105 and/or the centralized service 110. For example, access may be simplified to the point that a store associate connects a network connection, and power for the device 101 and the remote technician 115 resource will automatically access the device 101 when the resource is available. Any type and form of remote connectivity, control and boot device may be used at the point of service 105 and for the Internet Interface to provide automatic remote control, such as any such commercial device manufactured by Cisco Systems, Inc. of San Jose, Calif. In some embodiments, the device can be hooked up to the Internet Interface as simply as hooking up a USB connection and power rather than all peripherals as the remote technicians do need the mouse and keyboard.

In one embodiment, the Internet Interface 116 also may comprise any type and form of interface to access the functionality of the Internet Switch 106 and the centralized service 110. In another embodiment, the Internet Interface 116 may comprise any type and form of user interface, such as a graphical user interface, to provide information to convey to the remote technical resource to identify or characterize the nature of the work or tasked that is expected to be performed on the computer. In still another embodiment, the Internet Interface may include any type and form of web form and application programming interface (API) calls. In one embodiment, the Internet Interface 116 may include a questionnaire, a series of forms or a wizard to prompt for information to identify the type of service and the device in a manner desired or suitable by the Internet Switch 106, centralized service 110, and/or remote technician 115. The Internet Interface 116 may also include an interface to any type and form of call distribution software based upon work type. In some embodiments, the information and/or Internet Interface may be provided via any type and form of Customer Relationship Management (CRM) system. In yet another embodiment, the information may also identify which machine or device needs repair or service or is otherwise associated with the information submission via the Internet Interface. For example, the information provided may include a unique identifiable machine code such as an Internet Protocol (IP), Ethernet or Machine Access Control (MAC) address or a host name.

In some embodiments, points of service 105 at consumer outlets 103 providing technical support may provide a person who has the technical skills and/or knowledge to perform some of the repairs requested by customers. However, in some cases, it may be difficult to find a store associate 305 who has the full range of skills to address the majority of problems that may they may face. With the systems and methods described herein, a lower skilled store associate 305 may easily hook up the device 101 to the Internet Interface 116 and communicate work requirements to the Intelligent Switch 106. In one embodiment, the store associate may be replaced by a web based wizard to support a customer who wants to access services through a wireless hotspot or directly via a kiosk or a workbench at the point of service 105. In some cases, the remote technical resource may communicate directly with a customer after a device 101 has been hooked up to engage directly with the customer and diagnose the technical issue.

In some embodiments, if the store associate 305 has suitable skills, then the store associate 305 may manually assign the device 101 and work to an appropriate or design technical resource queue 108 to perform the service using a login and registration process. The Citrix GoToAssist client and management capability is an example of a desktop sharing application and platform for delivery of this type of interface. The Internet Interface and/or Internet Switch may include the GoToAssist support portal. Via the Internet Interface, the store associate may enter information in a form and submit a support item to a work queue 108.

In one embodiment, the consumer outlet 103 may include any type, form and location providing a point of service 105 at which service may be requested or accessed. In another embodiment, customers may be aggregated by a number of different venues. Some of these venues are consumer electronic stores or chains. Examples of these would be Circuit City and Frys Electronics. In other embodiments, other consumer outlet or venues may be non technical locations which have local access to consumers such as local cleaning stores, convenience stores, drug stores, etc. In one embodiment, the remote technical services described herein may be used to provide support for depot locations where devices are sent to be serviced at a central location. Original equipment manufactures (OEMS) such as Dell and HP use depots as do retailers such as Best Buy. In addition, other consumer outlets may be used such as any location where customers may access these services without having to set foot into a store location, such as any where wireless hotspots or internet connections are available. Examples of these could be commercial hotspots in airports, coffee shops or even access points from the parking lot of the above retail or consumer depot locations.

Customers may have a diverse set of devices and resource needs which request, are in need of service or may be serviced. The systems and methods described herein may be used to support, diagnose, repair or service any type and form of device and/or software. When new electronic devices are purchased, such as computers, they often require software (such as security software or office applications) to be installed. Older computers have a majority of issues which relate to the software rather than hardware. As a result, the majority of issues customers have with their computers relate to the software for example: viruses, spyware, performance problems, drivers, configuration, versions, etc. All of these problems may be fixed using the remote technical support system described herein. By the same approach, any device which connects to a network or computer such as printers, cameras, scanners, MP3 devices, telecommunication devices (cell phones), back-up storage and/or any other peripheral computing and/or network device may all be supported via centralized remote technical support services. For these devices, software installation and repair may be performed as well as training on the use of the devices, such as direct one on one training between the consumer and the technician, using the remote technical support system.

Figure 4:
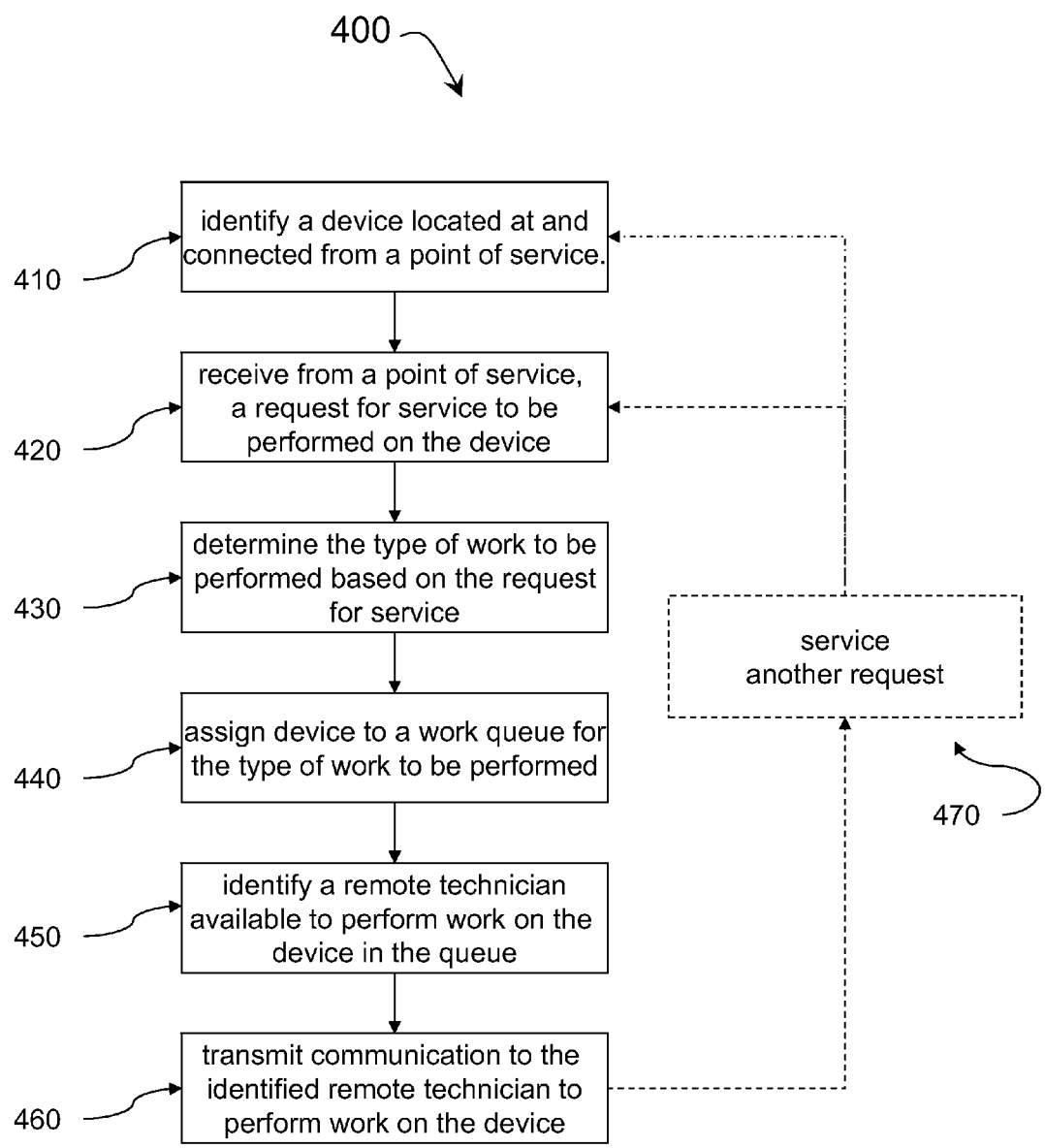
FIG. 4 is a flow diagram depicting steps of an embodiment of a method to allocate a service request to a remote technician via a centralized service.

Referring now to FIG. 4, a flow diagram depicting steps of an embodiment of a method for allocating a service request to a remote technician is shown and described. In brief overview, the method includes identifying (step 410) a device located at and connected from a point of service 105. The method further includes receiving (step 420) a request for service to be performed on the device 101 from the point of service 105 and determining (step 430) a type of work to be performed based on the service request. The centralized service 110 assigns (step 440) the device 101 to a queue and identifies (step 450) a remote technician to perform work on the queue. The method also includes transmitting (step 460) a communication to the identified technician to perform work on the device 101. In one embodiment, the centralized service 110 repeats one or more of the above mentioned steps to service (step 470) another work request.

In one embodiment, identifying (step 410) a device 101 connected at a point of service 105 includes verifying if the device 101 is authorized to receive service from a remote technician 115. In another embodiment, the identifying also includes determining if the device 101 is equipped with required resources to receive remote service. In still another embodiment, the connectivity and location of the device is identified by the centralized service 110. In further embodiments, the identifying includes but is not limited to determining the Media Access Control (MAC) address of the device 101, a type of device, a presence of a firewall, applications executing on the device and an operating system of the device 101.

A request for service to be performed on the device 101 is received (step 420) at the centralized service 110 and a type of work 202 to be performed is determined (step 430). In one embodiment, the centralized service 110 determined the type of work 202 based on one or more service level attributes 205 of the work request 201. In another embodiment, the determination may be performed in one of a plurality of possible ways as described with reference to FIG. 2. As an example, the centralized service 110 may determine, based on the work request 201 that the work type 202 is related to troubleshooting ADOBE PHOTOSHOP on the device 101 and the user of the device 101 prefers to be communicated with in Chinese. As another example, the centralized service 110 may determine that the work type 202 is related to connection issues that require a Cisco Certified Network Associate (CCNA) technician to resolve.

In one embodiment, the centralized service 110 assigns (step 440) the work request 201 from the device 101 to a queue and identifies (step 450) a remote technician 115 to perform work on the queue. In another embodiment, the centralized service may identify the remote technician 115 based on the work request 201 and assign the request to a queue for the remote technician. In one embodiment, the assignment to the queue is carried out in communication with a queue manager 230. In another embodiment, the queue manager may reassign the work request from one queue 108*a* to another queue 108*b* based on issues such as load balancing. Assignment to queues and identifying remote technicians are described with reference to FIG. 2. As an example, the queue manager 230 may detect that a technician 115*b* is experiencing connectivity issues and transfer work requests in the queue 108*b* of the technician 115*b* to the queue 108*c* of technician 115*c* who is suited to handle the work requests. In another example, the queue manager 230 may assign one request from the queue 108*b* to the queue 108*c* and assign another request from the queue 108*b* to the queue 108*a*.

The centralized service 110 transmits (step 460) a communication to the identified technician to perform work on the device 101. In one embodiment, the communication includes details on the work type 202 and/or one or more service level attributes 205. In another embodiment, the communication may include any instructions, notes and requests as apparent to one skilled in the art. In still another embodiment, more requests are serviced (step 470) by the centralized service. In one embodiment, the centralized service performs one or more of the steps 410-460 when servicing another work request. In one embodiment, if the work request is from the same device 101*a*, one or more steps beginning from step 420 are performed. In another embodiment, if the work request is from another device 101*b*, one or more steps beginning from step 410 are performed.

In some embodiments, the processes for providing the services involve preparation on the part of the store associate 305. In other embodiments, similar steps can be taken by the consumer 301 by interacting directly with a wizard or web form or any other type of user interface.

Figure 5:
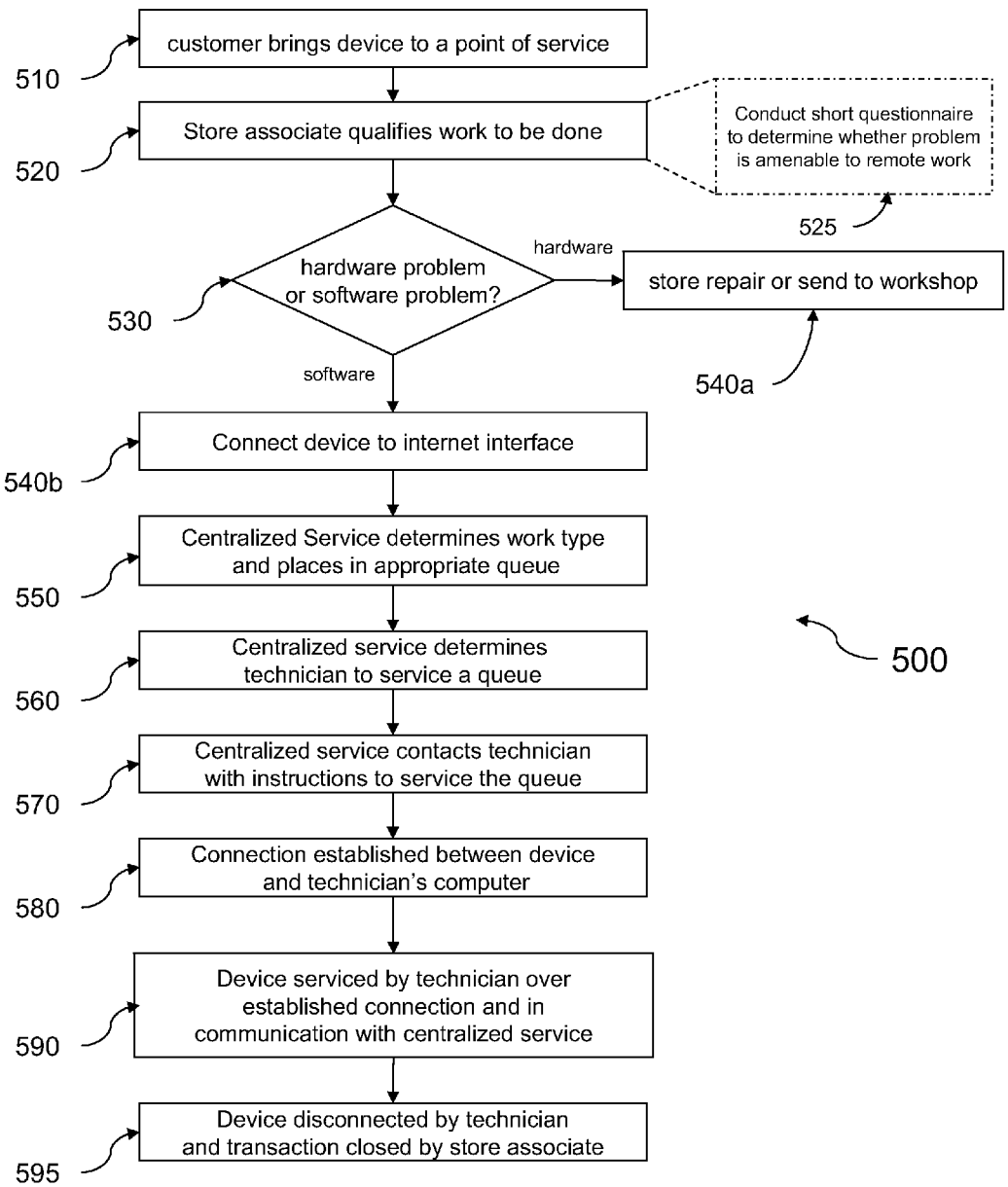
FIG. 5 is a flow diagram depicting steps of an embodiment of a method for providing support services to a device by a remote technician via a centralized service.

Referring now to FIG. 5, an example embodiment of an end-to-end method for using the techniques described herein are shown and described. In brief overview of steps of the embodiment of the above method, a customer visits a point of service 105 and brings (step 510) any device 101 for support or service by the consumer outlet 103. The store associate greets the customer and discusses the nature of the problem or the service requesting or desired to be performed for the customer. Based on the capabilities, skills and/or training of the store associate, the store associate determines or qualifies (step 520) the type of service or work to be performed. In one embodiment, the store associate or a technician onsite at the consumer outlet may determine (step 530) the problem is hardware related or requires a hardware repair. In this case, the store associate may send (step 540a) the device 101 or a part of the device 101 for repair or service to a hardware repair service or depot. In another embodiment, the store associate or an onsite technician determines diagnostics needs to be performed, or additional work needs to be performed to qualify the problem. In other embodiments, the store associate identifies the type of service or work to be performed on the device. The store associate or another resource at the consumer outlet may connect (step 540b) the device 101 to the internet interface 116 via the point of service 105. In some embodiments, the device 101 may be connected to an appliance or device designed and constructed to automatically allow remote access connectivity via the network from the Internet Interface 116 and/or Interface Switch. The store associate may enter information on the device, the service to be performed or the nature of the problem via a user interface. This information is submitted to the Internet Switch 106 via the Internet Interface. In some cases, this information or a portion thereof is updated or manually entered in a CRM system.

The submitted service or work request is assigned to a queue for a pool of resource. The Intelligent Switch determines (step 550) the work type from the submitted information and assigns the work to an appropriate pool of resources, or queue 108. The Intelligent Switch 106 of the centralized service 110 determines (step 560) a remote technician 115 is available to perform the work type for the queue and contacts (step 570) the remote technician 115 with instructions to service the queue 108. A connection is established (step 580) between the remote technician 115 and the device 101. The technician 115 services (step 590) the device 101, or attempts to service the requested device in communication with the centralized service 110. In one embodiment, the device 101 is serviced by the remote technician 115 using remote support system software such as GoToAssist manufactured by Citrix Online, LLC of Santa Barbara, Calif., part of Citrix Systems, Inc. of Ft. Lauderdale, Fla. In one embodiment, the remote technician 115 may log information into the CRM system regarding the service performed and the results thereof. In some embodiments, the remote technician 115 provides information on the device 101 regarding the service performed and the results thereof.

The remote technician 115 disconnects (step 595) from the device 101. The Intelligent Switch 106 or the remote technician 115 provides any type and form of notice or communication to the store associate 305 regarding status of the service, such as notice the work has been completed. The Store Associate interfaces with the customer, bills the customer and closes the service ticket or request.

The following depicts an example of an embodiment of steps of a method performed by the store associate in using the techniques described herein:

In some embodiments, the store associate determines (step 520) if the device 101 can be repaired remotely or if a diagnostic is required to determine if it can be repaired remotely. Many computers have problems that a technician must review to see if they are of software or hardware nature. In some embodiments, obvious or blatant hardware issues relate to physical devices which are not working such as power supplies, computer screens, and disk drives. Connectivity issues are those problems which prohibit a computer from being connected to a network, such as the Internet. In some of these cases a phone directed call may result in the computer connection being restored.

In other embodiments, the store associate 305 collects (step 325) and provides information to make sure that the to be assigned remote technician 115 is provided with information on what work needs to be done or the nature of the problem. The store associate 305 may enter this information via a web form of the Internet Interface 116 or Internet Switch. In one embodiment, the web form may provide a text field to describe the work or the selection of work type. In another embodiment, the web form text or selections is used to automatically communicate to the technician 115 what work needs to be done. In still another embodiment, the web form may include fields or selections to identify the device. In yet another embodiment, the device identifying information is used assure that any work on a machine is tracked, for example, completely from end to end of the process. Otherwise a technician may perform incorrect work on a computer or device and not be able to track which service was performed on what device.

The following depicts an example of an embodiment of steps of a method performed by a remote technician or agent in using the techniques described herein:

In one embodiment, the remote agent or technician 115 uses any combination of the desktop connectivity software, Intelligent switch software and/or CRM software to deliver and perform services on a device 101 at the consumer outlet 103. For example, the remote technician 115 may use the remote technical support services of PlumChoice Online PC Services of Billerica, Mass. to deliver services. The remote technician 115 may use any type and form of desktop connectivity software, such as those provided or manufactured by Citrix, e.g., GoToAssist, WebEx, LogMeIn or Microsoft. In one embodiment, the remote technician uses software and solutions by Telvisio of Foster City, Calif. In some embodiments, remote desktop connectivity software provides the agent with the ability to see the desktop of the device 101 and control the device 101 remotely as if the technician 115 were sitting in front of the device 101.

The Intelligent Switch 106 provides the connection of work 201 to a specific pool or queue 108 of resource and the assignment and dispatching of the work 201 to a specific available technician 115 to perform the work. The Intelligent Switch 106 is designed and constructed to accept input from the store associate 305 or customer from which to determine the work required and perform the intelligent switching. In some embodiments, the Intelligent Switch 106 may use any customer call center software and solutions manufactured by Aspect Software, Inc. of Irvine, Calif. A CRM software system may be used to track the work that is performed so that both the personnel at the consumer outlet and the technical agent can track the work and status of the work performed on a specific device 101. One embodiment of the remote technical support system uses a web based custom application to track the status of services although any type of tracking or software service may be used.

In one embodiment, when work is completed, the computer or device 101 at the consumer outlet is disconnected from the remote technician 115. For example, the remote technician 115 may log off the device 101 or terminate the remote desktop sharing connection to the device 101. In another embodiment, the device 101 may be disconnected from the Internet Interface 116 and/or Internet Switch. The status of the work may be passed back to the store associate 305 via a message left on the device 101 itself and/or via the ticketing system, such as a CRM, which tracks the work. In some cases, the remote technician 115 may communicate directly via phone, email or chat/Instant messaging with the store associate 305 or customer. In some embodiments, the ticketing system information may be used to charge the customer for work done.

B. Hybrid Model of Local Onsite Support with Remote Online Support Services

The systems and methods of the centralized remote technical support services described above may also be deployed for local onsite services. In these embodiments, the solution uses remote services technology to deliver the most appropriate trained technical resource to resolve the customer needs at the customer's home or location. The innovative application of the centralized technology discussed herein with innovative modification to skills and processes for local onsite service improves and optimizes the amount of cost required to deliver services to the home. Without the use of the technology and processes described herein, one or more technicians visits the consumer's home or location for an indeterminate period of time and for additional appointments to be scheduled when the work exceeds either the time or the skill of the one or more technicians.

By using the systems and methods described herein, the skills of the technician visiting the home may be redefined or re-scoped to be associated with connecting devices and enabling connection of the computers to a network or the Internet. The amount of time to perform these tasks is more deterministic and requires a much more focused set of skills. For example, an onsite service home service technician may be dispatched for ½ hour, hour or other predetermined time increments to perform a preliminary diagnostics and to setup up the service work to the Internet Switch, much like the store associate in the consumer outlet scenarios described above. Once the interconnection of the consumer device is complete and the device is hooked up to the Internet Switch, remote resources from the centralized service may be connected to complete all the necessary installations, configurations, training and repairs. As such, in these embodiments, appropriate skilled resources are applied without the need to send additional technicians to the consumer's location. The onsite technician may leave to attend other service calls once the device is hooked up to the Internet Switch.

A typical example scenario for a local onsite service is that a consumer may call for help because his or her computer is slow, lost connectivity to the Internet, experiencing lots of pop-ups and or perhaps would like to install some new devices. A technician may be assigned a time-frame of 1-3 hours reserved to perform the work. When the technician arrives on site he or she may diagnose the problem, and may start with a set of tools to fix the problem and then proceed to hook the computer up to the Internet, or verify connectivity to the Internet. Once done the technician may start to install new devices and software onto the computer. Without the use of the centralized remote technical services described herein, much of the time spent on site is watching the tools fix the problems as they can take a long time to scan and automatically fix problems. In some cases, the technician may run out of time or that there will be aspects of the work that will require another visit by a technician with a different set of skills. With the user of the centralized remote technical services described herein, a predetermined amount of time may be set for the technician for an onsite visit, such as a 1 hour appointment. In that time-period the technician may perform a diagnostics and connect and configure the device to be connected to the Internet Switch and pool of remote technical resources. The onsite technician may go to another place to do the same work—another home visit for a predetermined amount of time, after leaving the computer connected to the centralized remote technical support service. At that point, the computer may be assigned from a queue to a remote technician to perform the desired service based on the onsite technician's diagnostics, description of the problem or information submitted to the Internet Switch. The remote technician for example may clean and update the software and configuration of the computer and install any new devices. In addition, the remote technician may deliver training to the consumer at his home, such as live one on one training. If the remote technician performing the service is not the best or appropriate resource to perform the service, the connection to the consumer's computer may be transferred electronically and real-time to the next appropriate technician with out the need to reschedule an onsite visit.

Figure 6:
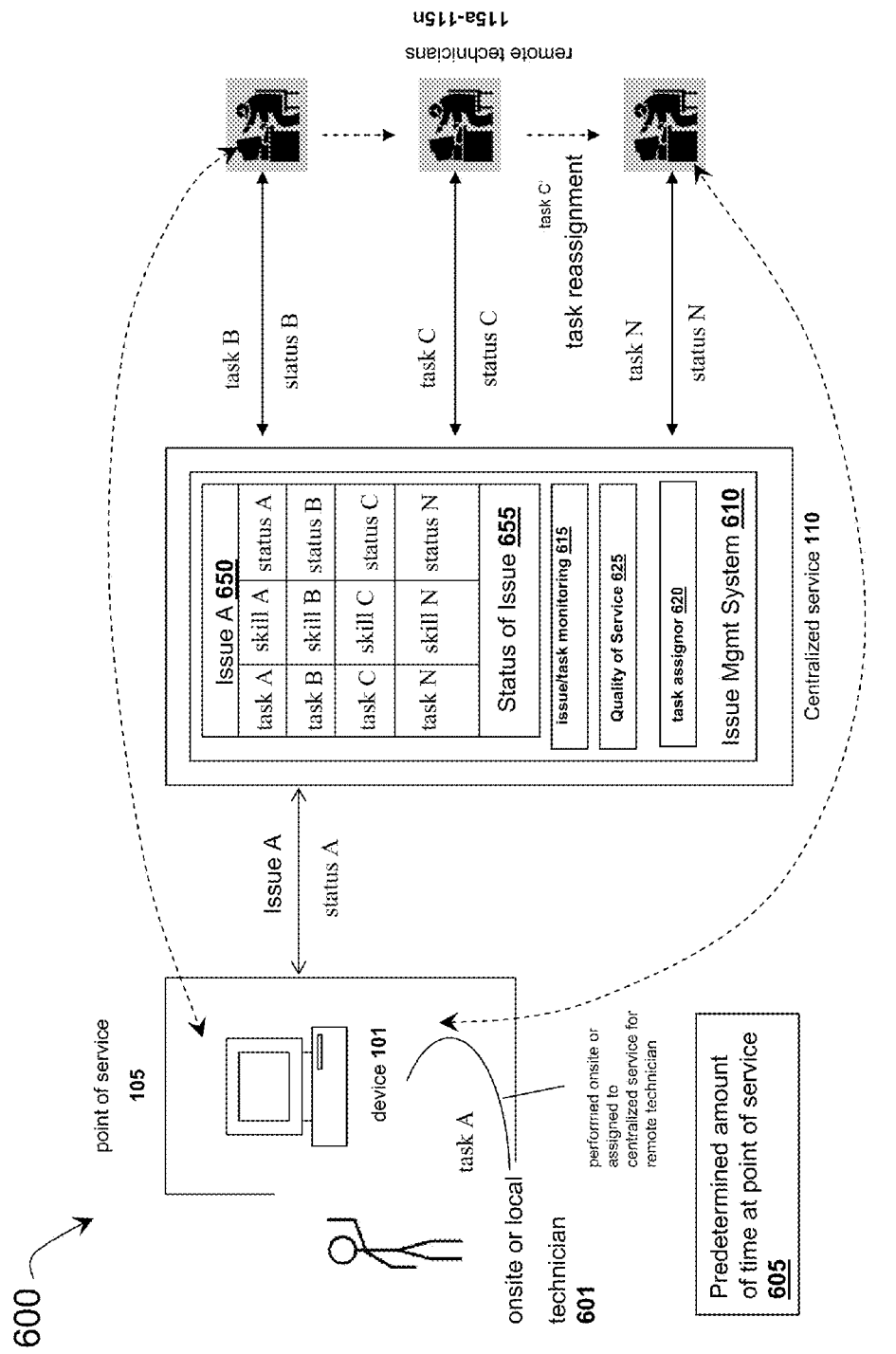
FIG. 6 is a block diagram of an embodiment of an environment to provide hybrid delivery of remote and local technical support via a centralized service.

Referring now to FIG. 6, a block diagram of an embodiment of an environment 600 to provide hybrid delivery of remote and local technical support via a centralized service is shown and described. In such an environment, an onsite or local technician 601 is assigned to provide service to a device 101 located at a point of service 105. The local technician 601 provides service to the device 101 for a predetermined time 605. An issue 650 with the device 101 is identified and communicated to the centralized service 110. The centralized service 110 includes an issue management system 610 that manages one or more issues 650. Each issue 650 may include one or more tasks that require one or more skills. A status 655 of the issue 650 is communicated to the point of service from the centralized service 110. The status 655 may be a function of one or more statuses of the one or more tasks. One or more tasks are assigned by the centralized service 110 to one or more remote technicians (115a-115n). The remote technicians 115 attend to the tasks and communicate a status for each task back to the centralized service 110. The issue management system 610 may include one or more of an issue/task monitoring unit 615, a Quality of Service (QoS) monitor 625 and a task assignor 620.

The point of service 105 may be any type and form of premise at any location. In one embodiment, the premise may be an outlet 103 of a retailer 102. In another embodiment, the premise may be a home. In still another embodiment, the premise may be an office or an office located in a home. In yet another embodiment, the premise may be a store or any other location where a consumer 301 has deployed the device 101. In a further embodiment, the premise may be a company. In some embodiments, the point of service includes any desktop computer or any device located at any type and form of company, business or enterprise. In some embodiments, the premise may be a mobile location. In one of these embodiments, the premise may be any vehicle such as a car, a bus, a truck, a train, a plane or a boat.

In some embodiments, the local technician 601 is an employee, contractor or any other person related to a company which provides onsite support services. An example of such a company is GEEK SQUAD, a subsidiary of BEST BUY of Richfield, Minn. The local technician 601 provides onsite technical support to the device 101. In one embodiment, the local technician 601 is a store associate 305 at an outlet 103 of a retailer 102. In another embodiment, the local technician 601 is a traveling technician deployed at the point of service 105 to provide technical support for the device 101. In one embodiment, the local technician 601 is deployed by a customer support group at an outlet 103 or any other location.

In another embodiment, the technician 601 is deployed by the centralized service 110. In still another embodiment, the technician 601 is deployed responsive to receiving a request for technical support at one of the point of service 105, the outlet 103 or the centralized service 110. In yet another embodiment, the technician 601 is chosen based on the request for technical support.

In one embodiment, the local technician 601 receives a communication to provide technical support on the device 101 at the point of service 105. The communication may be generated by any person or automated service at one of a point of service 105, an outlet 103 or the centralized service 110. In another embodiment, the communication may include details based on the request for technical support including but not limited to: nature of the problem, time, date, details of the device 101, history of support provided, name or identification of one or more technicians who previously serviced the device 101, location of the device 101, expected turnaround time and one or more skills required to service the request. The communication may be received by the technician 601 in many ways. In one embodiment, the communication is sent to a mobile device of the technician 601 via one or more networks 104. In another embodiment, the mobile device may include a smartphone, a personal digital assistant (PDA), a laptop or any other mobile device as apparent to one skilled in the art. In still another embodiment, the technician 601 may receive the communication via email, telephone or directly from another individual.

In one embodiment, the technician 601 spends a predetermined amount of time 605 at the point of service 105 in providing technical support to the device 101. In another embodiment, the predetermined amount of time 605 is a fixed amount of time. The predetermined amount of time 605 may be fixed, set or established by any person. In still another embodiment, the predetermined amount of time 605 may be fixed, set or established by an automated service. In one embodiment, the predetermined amount of time 605 is fixed, set or established by the centralized service 110. In another embodiment, the predetermined amount of time 605 is fixed, set or established by the customer. In still another embodiment, the predetermined amount of time 605 is set by the local technician 601. In yet another embodiment, the predetermined amount of time 605 is pre-set by the service provider providing the services described herein. In one embodiment, the predetermined amount of time 605 may be set at any predetermined date, time or schedule. In another embodiment, the predetermined amount of time 605 may be set on the basis of an availability of the local technician 605. In still another embodiment, the predetermined amount of time 605 is an amount of time set or established depending on one or more of nature of the problem, availability of the technician, demand for the technician, nature of the device and feasibility of onsite resolution. In yet another embodiment, the time 605 may be extended till a problem is resolved. In some embodiments, the predetermined amount of time 605 may be reset, re-established or re-fixed depending on one or more of nature of the problem, availability of the technician, demand for the technician, nature of the device, feasibility of onsite resolution and status of resolution. In other embodiments, if the problem is not resolved in the predetermined amount of time 605, the technician 601 refers the problem to the centralized service 110 for resolution. In still other embodiments, the predetermined amount of time 605 can be in any time units including seconds, minutes, hours and days.

The predetermined amount of onsite support time may be based on, caused by or otherwise determined based on the local technician having or applying a limited scope of skills to the issue and/or by limiting the scope of work of the local technicians to a subset of tasks towards resolving the issue. In one embodiment, the predetermined amount of time 605 is enabled by restricting the tasks performed by the local technician 601. In another embodiment, the local technician 601 performs a subset of tasks required for resolving an issue. In still another embodiment, the predetermined amount of time 605 is fixed, set or established on the basis of a predetermined set of tasks that the local technician 601 performs. In yet another embodiment, the predetermined amount of time 605 is determined on the basis of time needed by the local technician 601 to perform the predetermined set of tasks.

In some embodiments, a local technician is deployed having a predetermined or limited set of skills or certification. For example, the local technician may be skilled or certified in an aspect of network connectivity and/or Internet connection configuration or diagnostics of the same. Onsite, the local technician focuses on resolving any issue related to network connectivity in order to establish connectivity to and/or service from the centralized service. In some embodiments, the local technicians task is limited to any one or more of the following: identifying the issue, diagnosing/resolving/establishing operation of the device to connect to a network or the Internet, connecting the device to the Internet and/or the centralized service and providing an identification of the issues and other status information to the centralized service. In another embodiment, if the technician completes the predetermined scope of tasks prior to expiration of the predetermined time period the technician may continue to work on other tasks in resolving the issue for the customer. In one embodiment, the technician may use any remaining time of the predetermined amount of time to upgrade, sell or market any products and services to the customer. In other embodiments, if the technician completes the predetermined scope of tasks prior to expiration of the predetermined time period the technician may complete his visit and go to the next appointment.

The technician 601 provides many different types of technical support to the device 101. In one embodiment, the technician 601 may replace one or more parts of the device 101. In another embodiment, the technician 601 may provide software installation and/or upgrade services to the device 101. In still another embodiment, the technician may run hardware and/or software diagnostics on the device 101. In yet another embodiment, the technician may connect the device to the centralized service for further support and/or resolution of one or more issues 650. In one embodiment, the technician 601 connects the device 101 to the centralized service via an intermediate device 101' (not shown). In another embodiment, the technician 601 installs an agent 307 on the device 101 to connect the device to the centralized system 110. In still another embodiment, the technician 601 transports the device 101 to another location such as another point of service 105 or an outlet 103 to connect the device to the centralized service 110. In a further embodiment, the technician 601 identifies one or more issues 650 for resolution of the problem and communicates the issues to the centralized service 110. In one embodiment, the local technician 601 has a limited skill set of providing connectivity to the centralized service 110. In another embodiment, the local technician 601 may have a skill set to perform one or more of the following: provide remote support, diagnose issues, provide remote connectivity, replace hardware, back up data, load operating system, install software, reload data onto the device 101, set up and configure the device 101 and integrate the device 101 into an environment. In still another embodiment, the local technician 601 may have a skill set to work within a predetermined amount of time.

The local technician 601 may communicate with the centralized service 110 using any type and form of communications and/or devices. In one embodiment, the local technician 601 logs into the centralized service 110 via the device 101. In another embodiment, the local technician 601 logs into the centralized service via a mobile device such as a smartphone, personal assistant (PDA), a BLACKBERRY device or an IPHONE. In still another embodiment, the local technician 601 uses any other laptop, desktop or computing device to log into the centralized service 110. In one embodiment, the local technician 601 records or creates a log of services provided onsite. In another embodiment, the log of services may include but are not limited to the following information: name and/or identification of the local technician, skillset of the local technician, time, nature of problem, details of the device, list of operations performed on the device, results of the operations, identification of an issue, identification of one or more tasks, status of resolution, comments, suggestions and any other information relevant to providing technical support to the device. In still another embodiment, the log of services may be created using a software agent running on the device 101 and in communication with the centralized service 110. In yet another embodiment, the log of services may be created using a web interface. In some embodiments, the centralized service 110 determines, based on the log of services, whether there is an issue that may be resolved by one or more remote technicians.

The centralized service 110 may log, record or capture in any form and format any and all activity performed, occurring or related to use of the centralized service and/or providing of support services, including but not limited to telephone communications, email communications, application use, fax communications, login/logout to device activity, and system, application and operating events. The centralized service 100 may use any type and form of timestamp or mechanism for temporal recording of activities. In some embodiments, the centralized service 110 captures the remote login session to the device to record all the activity from the point of connection to logoff. In some of these embodiments, the centralized service 110 can play back a copy of the entire support session or any portion thereof. In one embodiment, the centralized service 1100 may filter any of the recorded or logged information based on any criteria. In another embodiment, the centralized service 100 may log, record or capture any activity in resolving or support a customer's issue across multiple remote technicians and may include the activity of the local technician. The local technician may log onto the centralized service as soon as possible at the start of the service or any time during the predetermined amount of time to have the centralized service log the local technician's activities as they occur.

In some embodiments, one or more issues 650 are communicated to the centralized service 110. In one of these embodiments, the one or more issues 650 are communicated from the device 101. In another of these embodiments, the one or more issues are communicated to the centralized service 110 via one or more of the point of service 105, the local technician 601, a device of the local technician 601 and one or more intermediate devices 101' including but not limited to servers, computers, networks, hubs, routers, proxies and any other devices as apparent to one skilled in the art. In one embodiment, the issue 650 is one that cannot be resolved by the skill set of the local technician 601. In another embodiment, the issue 650 is one that cannot be resolved by the local technician 601 within the predetermined amount of time 605. In still another embodiment, the issue 650 cannot be resolved by the local technician 601 with the resources available to the technician 601. In yet another embodiment, the issue 650 requires further support to the service performed onsite by the local technician 601. In some embodiments, the issue includes multiple tasks one or more of which cannot be performed by the local technician 601. In one of these embodiments, one or more of the multiple tasks cannot be performed by the local technician 601 within the predetermined amount of time 605.

In one embodiment, the centralized service 110 includes an issue management system 610 to manage the one or more issues 650. The issue management system 610 provides one or more functionalities to manage and/or resolve the one or more issues 650. In one embodiment, the issue management system 610 includes an issue/task monitoring unit 615 that monitors the status of one more issue and/or tasks related to an issue 650. In another embodiment, the issue management system 610 includes a quality of service (QoS) monitor 625 that provides quality control to one or more functionalities of the system 610. In still another embodiment, the issue management system 610 includes a task assignor 620 that manages assignment and/or reassignment of one or more tasks. In some embodiments, the issue management system 610 is implemented as a software. In one of these embodiments, the issue management system 610 includes one or more applications and/or programs. In another of these embodiments, the issue management system 610 executes on one or more devices housing the centralized service 110. In another embodiment, the issue management system 610 is implemented as a hardware unit. In still another embodiment, the issue management unit 610 is implemented as a distributed service/software over one or more hardware units. In still another embodiment, the issue management unit 610 includes both hardware and software components. In yet other embodiments, the issue management unit 610 may include any file, library, executable code, rule engine, database and other software as apparent to one skilled in the art. In some embodiments, the issue management unit communicates with one or more local technicians 601 and one or more remote technicians. In one of these embodiments, the issue management unit includes an interface to communicate with the one or more technicians.

In one embodiment, the issue management system 610 includes the issue/task monitoring unit 615. In another embodiment, the issue/task monitoring unit 615 monitors the statuses of one or more tasks. In still another embodiment, the issue/task monitoring unit 615 communicates the status of issue 655 to one of the device 101, the point of service 105 or a device of the local technician 601. The issue/task monitoring unit 615 may monitor the statuses of the tasks and/or the issue in many ways. In one embodiment, updates about the statuses of the one or more tasks may be pushed to the issue/task monitoring unit as they are received at the centralized unit 110. In another embodiment, the issue/task monitoring unit 615 polls the statuses of the tasks to receive the updates. In still another embodiment, the issue/task monitoring unit 615 communicates with the task assignor 620 and/or the quality of service monitor 625 to provide information on the status of the tasks and/or issue. In one embodiment, the issue/task monitoring unit 615 is implemented as an integrated part of the issue management system 610. In another embodiment, the issue/task monitoring unit 615 is implemented as a separate software and/or hardware unit. For example, the issue/task monitoring unit 615 may be implemented as a function or subroutine. In still other embodiments, execution of the software for the issue monitoring unit 615 may be distributed over one or more hardware units.

The task assignor 620 manages assigning of the one or more tasks to one or more remote technicians 115a-115n (115 in general). In one embodiment, the task assignor 620 is a part of the intelligent switch 106 as described with reference to FIG. 2. In another embodiment, the task assignor 620 includes a policy engine 224 that operates on the basis of a set of rules 226. In still another embodiment, the task assignor 620 communicates with the technician database 215 to choose one or more remote technicians 115 for one or more tasks. In yet another embodiment, the task assignor 620 assigns a technician 115 to a task on the basis of one or more capabilities 210 of the technician 115 corresponding to one or more service level attribute 205 identified for the task. In one embodiment, the task assignor 620 assigns a task to a work queue 108. In another embodiment, the task assignor 620 communicates with the queue manager 230 to manage assignment and/or reassignment of tasks to one or more queues. The technician database 215, remote technicians 115, capabilities 210, service level attributes 205, policy engine 224, rules 226, queue 108 and queue manager 230 are described with reference to FIG. 2.

In some embodiments, the task assignor 620 communicates with the issue/task monitoring unit 615 and QoS monitor 625 to manage assignment of the tasks. For example, if the issue/task monitoring unit 615 reports that a technician 115c has not updated the status of an assigned task C and/or a last update of status C indicates that task C is not being completed as expected, the task assignor 620 reassigns the whole or part of task C as task C' to another technician 115n. In other embodiments, the task assignor 620 receives feedback from the QoS monitor 625 to determine if the quality of service for a task satisfies the predetermined service threshold 222. In one embodiment, if the quality of service falls below the predetermined service threshold 222, the task assignor 620 reassigns the task to another technician. In one embodiment, the task assignor manages assignments and reassignments of local technicians 601 to provide onsite technical support.

The QoS monitor 625 may be implemented in any way and on any device. In one embodiment, the QoS monitor 625 is implemented as software and may include one or more of subroutines, files, libraries, and executable codes. In another embodiment, the QoS monitor 625 may include one or more parameters defining the predetermined service threshold 222. In still another embodiment, the QoS monitor 625 includes one or more hardware units. In some embodiments, the QoS monitor 625 executes a plurality of logical, mathematical and Boolean operations. In one of these embodiments, the QoS monitor 625 performs comparisons and/or calculations on one or more attributes of the tasks and one or more attributes and/or parameters related to the predetermined service threshold 222.

One or more issues 650 may be identified for the device 101. In one embodiment, the one or more issues are identified by the local technician 601. In another embodiment, the one or more issues are identified by the customer. In still another embodiment, the one or more issues are identified by the centralized service 110. In yet another embodiment, one or more of the centralized service 110, the customer and the local technician 601 participate in identifying the one or more issues 650. In one embodiment, the one or more issues 650 are addressed and/or resolved to complete the request for technical support. An issue 650 may include several attributes. In one embodiment, resolving an issue 650 may include completion or execution of one or more tasks (task A, task B, task C, task N etc.). In another embodiment, execution of each task may require a separate skill. For example completing or executing task A may require skill A, completing task B may require skill B and completing task C may require skill C. In still another embodiment, one or more tasks may require one skill or a combination of skills. As an example, task A and task N may require skill C and task C may require one or more of skill A, skill B and skill N. In some embodiments, each of the tasks has a status. In one of these embodiments, the status 655 of the issue 650 may depend on one or more of the task statuses.

In one embodiment, each of the tasks has to be completed to resolve the issue 650. In another embodiment, resolution of the issue 650 may include completion of one or more essential tasks and one or more optional tasks. In still another embodiment, the issue 650 may be resolved via completion of the one or more essential tasks. In yet another embodiment, completion of one or more tasks may be dependent on completion of one or more other tasks. As an example, completing task A may be dependent on completion of tasks B and C. In such cases the tasks are completed in a predetermined order. In a further embodiment, the tasks may be completed in any order. In some embodiments, all or some of the tasks are prioritized.

In some embodiments, the tasks for resolving the issue 650 are determined by the local technician 601. In other embodiments, the tasks for resolving the issue 650 are determined by the centralized service 110. In still other embodiments, the local technician 601 and the centralized service 110 work in conjunction to determine the tasks for resolving the issue 650. In one embodiment, the local technician 601 and/or the centralized service 110 may modify or delete one or more tasks determined by the local technician 601 and/or the centralized service 110. In another embodiment, the centralized service 110 and/or the local technician 601 determines the tasks based on one or more attributes of the issue 650. In one embodiment, one or more mathematical, statistical, logical or Boolean operations are performed by the centralized service 110 on one or more attributes of the issue 650 to determine the tasks for resolving the issue 650. In another embodiment, the tasks for resolving the issue 650 may be determined by a software agent 307 executing on the device 101. In still another embodiment, the software agent 307 may communicate with one or more of the local technician 601 and the centralized service 110 in determining the tasks. In some embodiments, one or more remote technicians determine or identify the issues of the customer with or without the local technician.

In one embodiment, the centralized service 110 identifies one or more skills required for completion of each of the tasks. In another embodiment, the centralized service 110 identifies the one or more skills based on an identification of a work type 202. In still another embodiment, the work type for each task is identified by one or more service level attributes 205. In yet another embodiment, skill is identified as a service level attribute 205. Work type 202 and service level attributes 205 are described with reference to FIG. 2.

The centralized service 110 provides one or more updates on the issue 650 by providing a status 655 of the issue 650. In one embodiment, the status 655 includes information on what percentage of the issue 650 has been resolved. In another embodiment, the status 655 may include one or more queries requiring a feedback from one of the device 101, the point of service 105 or the local technician 601. In still another embodiment, the status 655 includes identification of statuses of one or more tasks. In yet another embodiment, the status 655 identifies which tasks have been completed and/or which tasks are pending. In some embodiments, the statuses of the one or more tasks are communicated to the centralized device 110 from a corresponding remote technician 115 attending to the task. In a further embodiment, the status 655 is derived from the one or more statuses of the tasks identified to resolve the issue 650.

Figure 7:
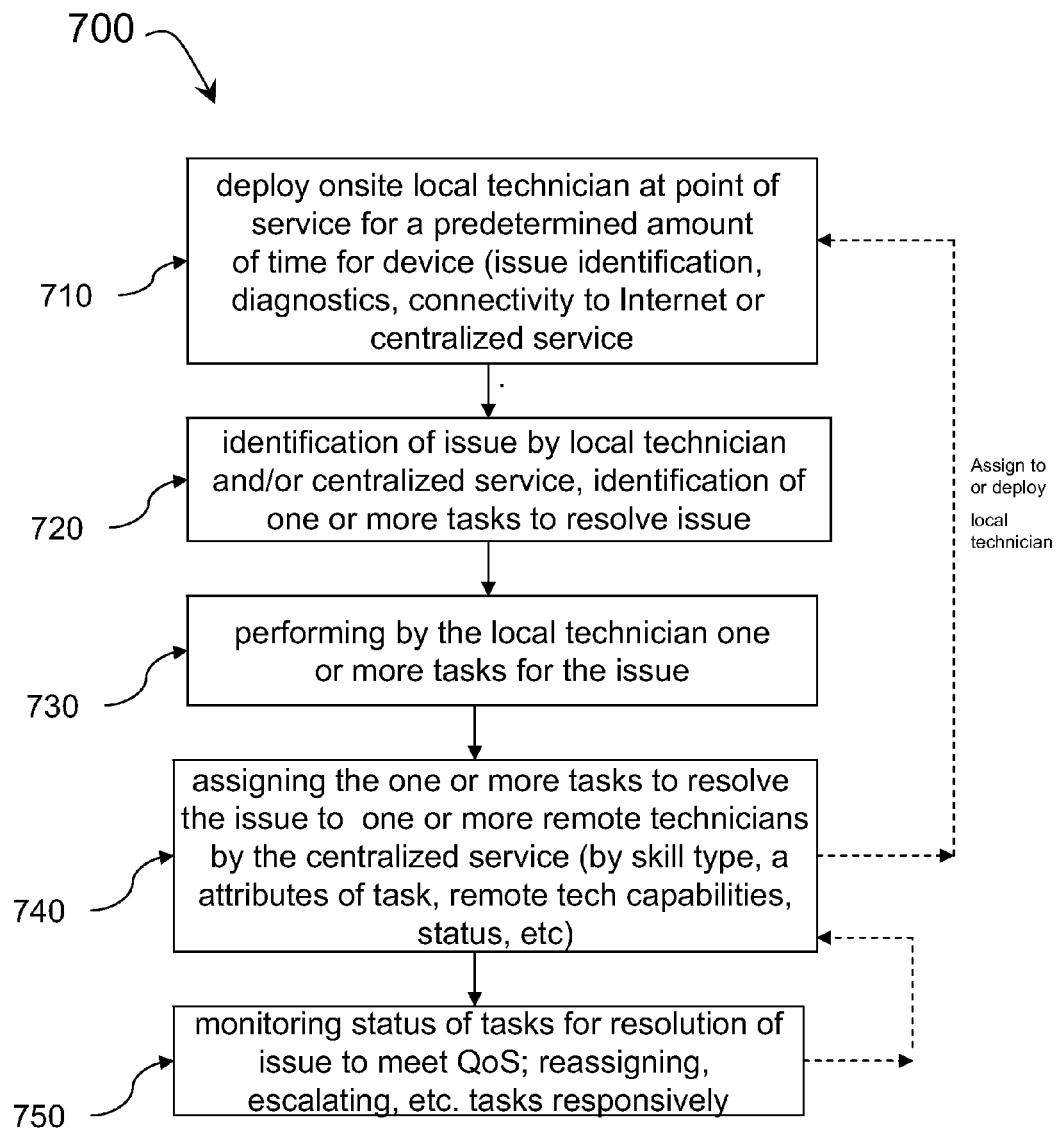
FIG. 7 is a flow diagram depicting steps of an embodiment of a method to manage hybrid delivery of remote and local technical support via a centralized service.

Referring now to FIG. 7, a flow diagram depicting steps of an embodiment of a method to provide and manage hybrid delivery of remote and local technical support via a centralized service is described. In one embodiment, the method includes deploying (step 710) a local technician at a point of service to provide onsite technical support to a device. An issue with the device and one or more tasks for resolving the issue are identified (step 720) and the local technician performs (step 730) one or more tasks for the issue. The centralized service assigns (step 740) one or more tasks to resolve the issue to one or more remote technicians and monitors (step 750) the statuses of the one or more tasks.

The local technician 601 is deployed (step 710) at the point of service 105 to perform one of a plurality of possible tasks. In one embodiment, the local technician 601 performs a diagnostic test on the device 101. In another embodiment, the technician 601 identifies one or more issues with the device 101 that are to be resolved. In still another embodiment, the technician 601 identifies one or more tasks associated with each issue. In another embodiment, the technician performs service on the device 101 to resolve one or more issues and/or tasks. In yet another embodiment, the technician 601 connects the device 101 to the centralized service 110. In one embodiment, the technician 601 checks, repairs, troubleshoots or establishes a connectivity of the device 101 to the internet and/or the centralized service. In further embodiments, the local technician 601 may perform any task or function such as the ones described with reference to FIG. 6.

In one embodiment, the technician 601 is deployed to spend a predetermined amount of time 605 at the point of service 105 in providing technical support to the device 101. The predetermined amount of time 605 is may be fixed, set or established by any person or automated service such as the centralized service 110, the customer or the local technician 601. In another embodiment, the technician 601 is deployed for the predetermined amount of time 605 as pre-set by the service provider providing the services described herein. In one embodiment, the technician 601 may be deployed at any predetermined date, time or schedule. In another embodiment, the technician 601 may be deployed on the basis of an availability of the technician 605. In still another embodiment, the technician 601 may be deployed for a predetermined amount of time 605 depending on one or more of nature of the problem, availability of the technician, demand for the technician, nature of the device and feasibility of onsite resolution. In yet another embodiment, the technician 601 may be deployed for a time extended till a problem is resolved. In other embodiments, if the problem is not resolved in the predetermined amount of time 605, the deployed technician 601 refers the problem to the centralized service 110 for resolution. In one embodiment, the technician 601 is deployed responsive to a customer contacting the centralized service 110 about the device. In another embodiment, the customer may contact the centralized service via a website, email or any other form of electronic communication. In other embodiments, the customer may contact persons associated with the centralized service via phone, postal mail or helpdesk services. In still other embodiments, the deployed technician 601 is selected based on information on the device 101 provided by the customer. The centralized service 100 may select the appropriate or desired local technician to deploy onsite based on information received from the customer. Via this customer contact, a pre-evaluation of the issue may occur to determine the nature of the issues and the technician to deploy onsite. This may be done in cases when the customer cannot first connect to the device to the Internet and/or the centralized service.

In one embodiment, one or more issues and/or tasks to resolve the one or more issues are identified (step 720). In one embodiment, the one or more issues are identified by the local technician 601. In another embodiment, the one or more issues are identified by the centralized service 110. In still another embodiment, the local technician 601 and the centralized service 110 identifies one or more tasks to resolve the issue. In yet another embodiment, the local technician 601 may work in cooperation with the centralized system 110 to identify the one or more issues and/or one or more tasks. In a further embodiment, the local technician 601 and the centralized service 110 exchange information with each other in identifying the one or more issues and/or one or more tasks. In some embodiments, the tasks are identified based on a predetermined checklist or template. In one of these embodiments, the checklist or template is parsed for each issue to determine a list of tasks related to the issue. In another of these embodiments, the checklist or template is prepopulated with known issues and the corresponding tasks. In still another of these embodiments, the checklist or template is adaptively created and/or modified.

The local technician 601 performs (step 730) one or more tasks to resolve one or more of the identified issues 650. In one embodiment, the local technician 601 performs a part of one or more tasks. In another embodiment, the technician 601 performs the one or more tasks for a predetermined amount of time 605. In still another embodiment, the technician 601 completes all parts of one or more tasks if within skill level and/or time available to the technician. In one embodiment, the technician 601 works in communication with the centralized service 110 to perform the one or more tasks. In another embodiment, the technician 601 may collaborate, consult or coordinate with one or more other local technicians 601 and/or one or more remote technicians 115. In still another embodiment, performing the one or more tasks include installing an agent 307 or other software to connect the device 101 to the internet and/or the centralized service 110.

The centralized service 110 assigns (step 740) one or more tasks to resolve the issue 650 to one or more remote technicians 115. In one embodiment, the assignment is done responsive to receiving a communication from one of the device 101 or the local technician 601 such as a status 655 of the issue 650. In another embodiment, a task assignor 620 of the centralized service 110 manages the assigning of the one or more tasks to the one or more remote technicians. In yet another embodiment, the centralized service 110 reassigns to one or more technicians 115, one or more tasks previously assigned to one or more other remote technicians 115. In one embodiment, the assignment and/or reassignment of tasks is done on the basis of one or more of: skill type required or desired for the task, one or more attributes of the task, capabilities of the remote technicians, statuses of the tasks and/or issues and availabilities of the remote technicians. In another embodiment, the centralized service 110 assigns the one or more tasks to one or more queues 108. In still another embodiment, the queue manager 230 of the centralized service 110 manages assignments and reassignments to the queues 108.

In one embodiment, the assigning of step 740 includes deploying one or more local technicians 601 to provide onsite support at the point of service 105. In another embodiment, one or more additional local technicians 601 are deployed or assigned to provide onsite support based on communication received from the local technician 601 previously deployed.

In still another embodiment, one or more local technicians 601 are deployed responsive to the centralized service receiving a request for providing technical support on a device 101 located at a point of service 105.

The centralized service 110 monitors (step 750) the issue and/or the status of one or more tasks for resolution of the issue 650. In one embodiment, the monitoring includes determining if the support provided by the one or more remote and/or local technicians satisfies a predetermined service level threshold 222. In another embodiment, the monitoring includes determining if a task assigned to a remote technician 115 is completed within a reasonable time. In still another embodiment, the centralized service 110 reassigns and/or escalates a task to a different remote or local technician responsive to determining that a task assigned to a technician is not serviced within a reasonable time and/or the service provided fails to satisfy the predetermined service level threshold 222. In yet another embodiment, the centralized service 110 may escalate a task to a high priority status on monitoring that a critical event has occurred. In a further embodiment, the monitoring may include communicating with the queue manager to determine availability of one or more remote and/or local technicians. In another embodiment, the monitoring includes determining if the issue is resolved within a predetermined amount of time.

In view of the structure, functions and apparatus of the systems and methods described here, the present solution provides a dynamic, efficient and intelligent system for providing hybrid technical support, including local and remote technical support, to devices via a centralized service. Having described certain embodiments of methods and systems for providing the hybrid technical support, it will now become apparent to one of skill in the art that other embodiments incorporating the concepts of the invention may be used. Therefore, the invention should not be limited to certain embodiments, but rather should be limited only by the spirit and scope of the following claims:

It is claimed:

1. A method for providing remote online support service in conjunction with local onsite support service, the method comprising the steps of:
   (a) providing, by a local technician, a predetermined amount of time of onsite support service for a device at a premise, the local technician having a first type of skill from a plurality of skills;
      establishing, by the local technician within the predetermined amount of time, remote connectivity between the device at the premise and a centralized service, the local technician performing within the predetermined amount of time one or more tasks for resolution of the issue, leaving the premise upon expiration of the predetermined amount of time and leaving the device connected to the centralized service for remaining portions of the requested service to be performed by one or more remote technicians via the centralized service;
   (b) receiving, by the centralized service, identification by the local technician of an issue with the device resolution of the issue comprising a plurality of tasks, each of the plurality of tasks to be performed by one or more remote technicians having a corresponding skill type from the plurality of skills, the predetermined amount of time comprising a fixed amount of time of a total time of both the local technician and the centralized service to complete the plurality of tasks for resolution of the issue and to at least connect the device via a network to the centralized service for one or more remote technicians to continue performing the requested service via the centralized service; and
   (c) performing, by a first remote technician having a second type of skill from the plurality of skills, a first task of the plurality of tasks on the device via a first network connection to the device, the centralized service assigning the first task to the first remote technician.

2. The method of claim 1, wherein the one or more tasks of the plurality of tasks for resolution comprises establishing remote connectivity of the device to the centralized service.

3. The method of claim 1, wherein step (b) further comprises identifying, by the centralized service, one or more of the plurality of tasks for resolution of the issue.

4. The method of claim 1, wherein step (c) further comprises automatically assigning, by the centralized service, the first task to the first remote technician based on one or more attributes of the first task corresponding to one or more skill types of the first remote technician.

5. The method of claim 1, wherein step (c) further comprises automatically assigning, by the centralized service, a second task of the plurality of tasks to a second remote technician having a third type of skill and performing by the second remote technician, the second task via one of the first network connection or a second network connection to the device.

6. The method of claim 5, wherein step (c) further comprises assigning, via the centralized service, the second task of the plurality of tasks to a third remote technician.

7. The method of claim 1, wherein each of the tasks of the plurality of tasks for resolution of the issue comprise a different skill type of the plurality of skills.

8. The method of claim 1, wherein the one or more remote technicians connect via a network to the device to perform each task of the plurality of tasks for resolution of the issue.

9. A system for providing remote online support service in conjunction with local onsite support service, the system comprising:
   an interface of a centralized service for receiving identification of an issue by a local technician providing a predetermined amount of time of onsite support service for a device at a premise, the local technician having a first type of skill from a plurality of skills;
      wherein the centralized service establishes via the local technician within the predetermined amount of time, remote connectivity between the device at the premise, the local technician performing within the predetermined amount of time one or more tasks for resolution of the issue, leaving the premise upon expiration of the predetermined amount of time and leaving the device connected to the centralized service for remaining portions of the requested service to be performed by one or more remote technicians via the centralized service;
      wherein the predetermined amount of time comprises a fixed amount of time of a total time of both the local technician and the centralized service to complete the plurality of tasks for resolution of the issue and to at least connect the device via a network to the centralized service for one or more remote technicians to continue performing the requested service via the centralized service;
      an engine of the centralized service identifying that resolution of the issue comprises a plurality of tasks, each of the plurality of tasks to be performed by one or more remote technicians having a corresponding skill type from the plurality of skills; and wherein the centralized service assigns the first task to a first remote technician, the first remote technician having a second type of skill from the plurality of skills, a first task of the plurality of tasks on the device via a first network connection to the device.

10. The system of claim 9, wherein the one or more tasks of the plurality of tasks for resolution comprises establishing remote connectivity of the device to the centralized service.

11. The system of claim 9, wherein the engine identifies one or more of the plurality of tasks for resolution of the issue.

12. The system of claim 9, wherein the centralized service automatically assigns the first task to the first remote technician based on one or more attributes of the first task corresponding to one or more skill types of the first remote technician.

13. The system of claim 9, wherein the centralized service automatically assigns a second task of the plurality of tasks to a second remote technician having a third type of skill and performing by the second remote technician, the second task via one of the first network connection or a second network connection to the device.

14. The system of claim 13, wherein the centralized service assigns the second task of the plurality of tasks to a third remote technician.

15. The system of claim 9, wherein each of the tasks of the plurality of tasks for resolution of the issue comprise a different skill type of the plurality of skills.

16. The system of claim 9, wherein the one or more remote technicians connect via a network to the device to perform each task of the plurality of tasks for resolution of the issue.

* * * * *